United States Patent [19]
Yamada et al.

[11] Patent Number: 5,445,309
[45] Date of Patent: Aug. 29, 1995

[54] METHOD FOR MAKING A JOINT BETWEEN A MAIN PIPE AND A BRANCH PIPE AND APPARATUS FOR USE IN THE METHOD

[75] Inventors: Yonekazu Yamada, Sakado; Yutaka Yoshino, Otsu; Mitsuhira Kitada, Tokorozawa; Kazuo Seki, Kawagoe, all of Japan

[73] Assignee: Sekisui Kagaku Kogyo Kabushiki Kaisha, Osaka, Japan

[21] Appl. No.: 988,891

[22] Filed: Dec. 10, 1992

[30] Foreign Application Priority Data

| Dec. 10, 1991 | [JP] | Japan | 3-325636 |
| Feb. 18, 1992 | [JP] | Japan | 4-030579 |
| Jul. 17, 1992 | [JP] | Japan | 4-190731 |
| Sep. 16, 1992 | [JP] | Japan | 4-246263 |
| Sep. 22, 1992 | [JP] | Japan | 4-252572 |
| Sep. 22, 1992 | [JP] | Japan | 4-252573 |

[51] Int. Cl.⁶ .................. B23K 101/04; B23K 20/00; B29C 65/02
[52] U.S. Cl. .................. 228/170; 228/171; 156/304.6; 29/890.148
[58] Field of Search ............ 228/170, 171, 250; 29/890.148; 156/304.6

[56] References Cited

U.S. PATENT DOCUMENTS

| 1,220,770 | 3/1917 | Murray | 29/890.148 |
| 3,013,925 | 12/1961 | Larsen | 156/153 |
| 3,254,909 | 6/1966 | Ver Nooy | 29/890.148 |
| 3,616,024 | 10/1971 | Windle | 156/293 |
| 3,634,167 | 1/1972 | Plontke | 156/304.6 |
| 4,675,965 | 6/1987 | Offringa et al. | 29/890.148 |
| 4,746,056 | 5/1988 | Thomsen | 228/170 |

FOREIGN PATENT DOCUMENTS

| 0008135 | 2/1980 | European Pat. Off. |
| 0188028 | 7/1986 | European Pat. Off. |
| 8523782 | 10/1985 | Germany . |
| 48-62868 | 9/1973 | Japan . |
| 51-32671 | 9/1976 | Japan . |
| 58-2955 | 1/1983 | Japan . |
| 3-128191 | 5/1991 | Japan .................. 228/170 |
| 1549169 | 7/1979 | United Kingdom . |
| 2025556 | 7/1979 | United Kingdom . |

*Primary Examiner*—P. Austin Bradley
*Assistant Examiner*—Jeffrey T. Knapp
*Attorney, Agent, or Firm*—Ronald R. Snider

[57] ABSTRACT

In a method for making a joined pipe, a main pipe is cut so that two V-shaped edges of a right angle are formed in the diametrical positions on the periphery of the main pipe, and a branch pipe is cut so that two peaked edges of a right angle are formed in the diametrical positions on the periphery of the branch pipe. Then, the facets of the V-shaped edges and the peaked edges are fused by heating, and butt-welded under pressure.

9 Claims, 21 Drawing Sheets

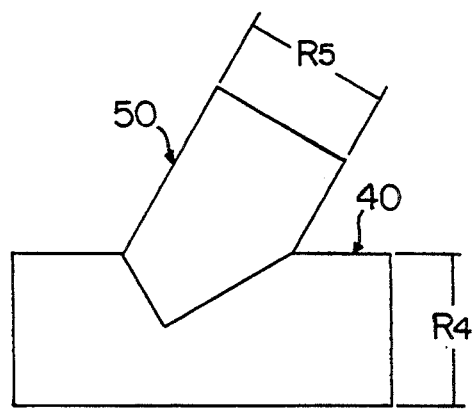
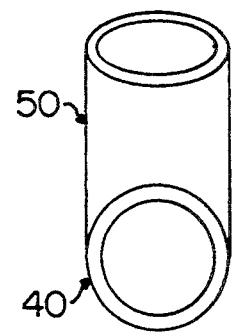
FIG. 6(a)　　　　FIG. 6(b)
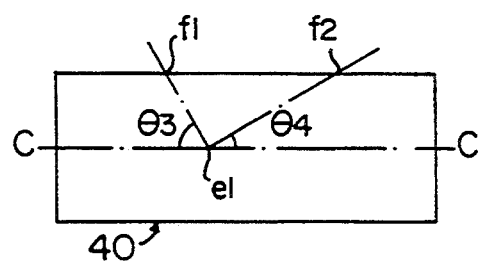
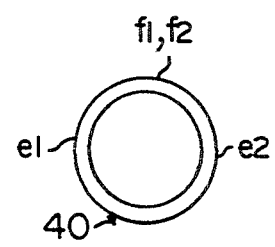
FIG. 7(a)　　　　FIG. 7(b)
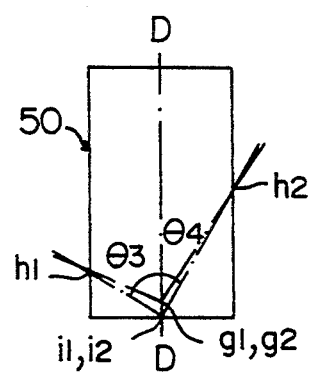
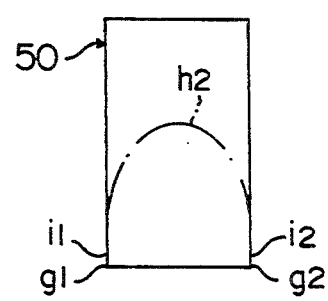
FIG. 8(a)　　　　FIG. 8(b)

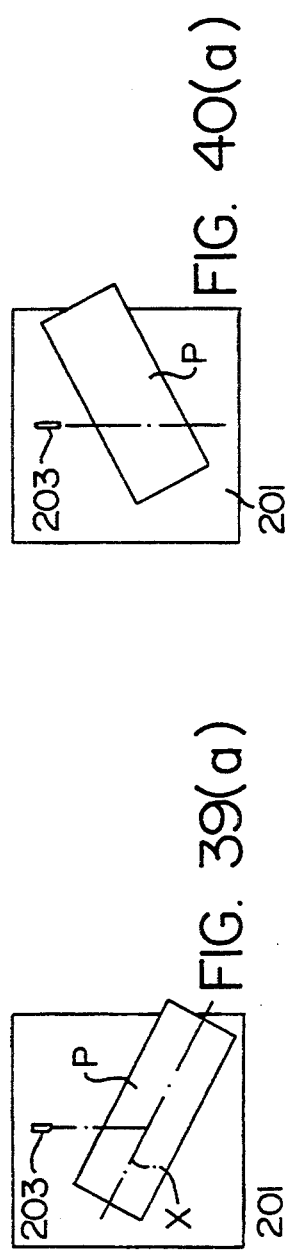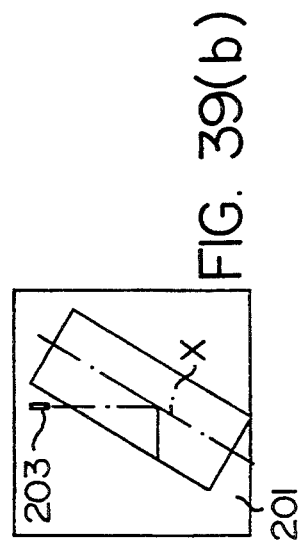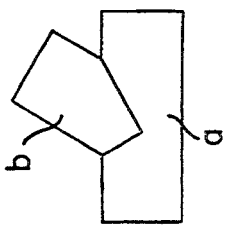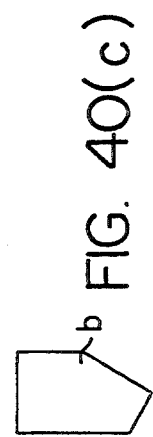
FIG. 41
FIG. 40(a)
FIG. 40(b)
FIG. 40(c)
FIG. 39(a)
FIG. 39(b)
FIG. 39(c)

METHOD FOR MAKING A JOINT BETWEEN A MAIN PIPE AND A BRANCH PIPE AND APPARATUS FOR USE IN THE METHOD

FIELD OF THE INVENTION

This invention relates to a method for making a joint between a main pipe and a branch pipe having the same diameter and apparatus for use in the method, and in particular to a method for making a joint between a main pipe and a branch pipe such as a T-shaped joint or a double T-shaped (cross-shaped) joint, a heating apparatus used for heating the pipes to be fused, a cutting apparatus used for cutting the pipes and a butt-welding apparatus used for butt-welding the pipes by fusion.

BACKGROUND OF THE INVENTION

An injection molding method has been generally used as the method for making a joint between a main pipe and a branch pipe made of synthetic resin, such as polyethylene. However, the injection molding method has a disadvantage due to manufacturing cost, as different molds are required for pipes having different sizes and shapes, especially when the manufacturing amount is small and requires a specific size. Therefore, in order to reduce the facility cost, other methods have been adopted in which pipes are worked afterwords, which are: the drawing method, the blow molding method and the welding method.

In the drawing method, first, a hole is made in the wall of a main pipe and then the periphery of the hole is softened by heating. Next, a mold having a flat top is inserted into the main pipe from one end thereof, and then the mold is pulled out of the main pipe through the hole by pulling a member which is hooked to the mold. The periphery of the hole rises and a flat top is formed at the periphery of the hole by pulling the mold out of the main pipe. Then, a branch pipe is fixed to the flat top of the periphery of the hole of the main pipe by fitting or cementing. This method has been described in Japanese Patent Provisional Publication No. 62868/73.

In the blow molding method, first, a predetermined part of the wall of a main pipe is softened by heating, and then a hill having a flat top is formed on the softened part, and then a hole having a diameter slightly larger than the outer diameter of a branch pipe is formed. Then, the branch pipe is inserted through the hole and fixed with the main pipe by fitting or cementing. This method has been described in Japanese Utility Model Publication No. 2955/83.

In the welding method, first, a hole is made in the wall of a main pipe, while one end of a branch pipe is cut to a have the corresponding profile of the hole of the main pipe, and then the cut end of the branch pipe and the periphery of the hole are welded. In many cases, the welded peripheries may be coated with fiber-reinforced plastic (FRP) for reinforcing the joint.

However, there are disadvantages to these methods.

In the drawing method, it is required to make a periphery of a flat top having a diameter equal to or larger than the outer diameter of the branch pipe, so this method can not be applied for making a joint between the main and branch pipes having the same diameter, as it is impossible to raise the periphery of the hole of the main pipe.

In the blow molding method, the center of the softened part in the wall of the main pipe is elongated first and then the outer part is elongated gradually to form a flat top of the periphery in blow molding. As a result, the root of the elongated periphery becomes thin, though most of load is concentrated thereto and therefore requires strength. Consequently, the endurance limit of the joint is not satisfied resulting poor reliability.

In the welding method, considerable skill is required for welding, so that the strength in fixing the branch pipe to the main pipe can be stably obtained only by a skilled operator. Further, the welding operation is time-consuming.

These disadvantages may be resolved by adopting the butt-welding method by fusion, in which the two pipe ends of the main and branch pipes are fused by heating and then butted to make a joint under pressure. However, there are disadvantages in the butt-welding method by fusion.

One of the disadvantages in the butt-welding method by fusion, is that it requires the process for removing a bead. A bead is generated in the inner wall of the joint between the main and branch pipes after butt-welding, so it is required that the bead be removed. If a cutting tool such as a rotary cutter or a pressure cutter is used for removing a bead, it is required that the cutting tool be inserted into the main pipe to remove the bead generated in the inner wall thereof and into the branch pipe to remove the bead generated in the inner wall thereof. However, the bead in the branch pipe should be removed by hand instead of the cutting tool, because the inner wall of the branch pipe may be damaged by the cutting tool when inserted deeply into the branch pipe to remove all the bead. Accordingly, the operation becomes complicated, such that the operation consumes time and a stable result can not be obtained. Further, if the pipes are made of crystalline polymer material such, as polyethylene resin, the pipes become deformed to some extent due to stress and relaxation of the material, so that it is required to obtain accuracy in butting the periphery of the hole of the main pipe and the peaked edge of the branch pipe by some means.

If butt-welding is carried out with cores inserted into the pipes from three directions to be located at the inside of the joint as described in Japanese Patent Publication No. 32671/76 and UK Patent No. 1549169, holding members are required for holding the main and branch pipes in three points and supporting members used in inserting and withdrawing the pipes. Additionally, the cores are not always fitted tightly and there may be generated spaces therebetween due to deformation of the main and branch pipes and manufacturing error of the cores and so on, so that there is the possibility of the generation of a bead in the case where fused resin flows into the spaces between the cores.

Second, one of the disadvantages in the butt-welding method by fusion is that appearance of the joint is poor and the strength of the butt-welding is not sufficient. When the main and branch pipes are joined by butt-welding, in which the hole of the main pipe and the peaked edge of the branch pipe are fitted, the fused resin in the periphery of the hole of the main pipe and the peaked edge of the end of the branch pipe is extruded towards the inside and outside of the pipes by applying pressure. As a result, the hole becomes deeper as the fused resin is extruded, even though the hole was made to have the two V-shaped edges located diametrically on the periphery of the main pipe. On the other hand, the peaked edge of the opening of the branch pipe does not change in shape, though the branch pipe becomes short. If the hole of the main pipe becomes deeper, the lowest point of the V-shaped edge of the hole moves lower and becomes narrow, so that more fused resin is extruded out in the vicinity of the lowest point. Consequently, the peaked edge of the opening of the branch pipe is butt-welded deep into the hole of the main pipe and an irregular bead is generated in the butt-welded joint, so that the butt-welded joint has a poor appearance and the fixing strength is not stable due to the difference between the width of the V-shaped edge of the hole of the main pipe and the peaked edge of the opening of the branch pipe.

Third, one of the disadvantages in the butt-welding method by fusion is that a burr is generated in the butt-welding joint. If the branch pipe is fixed to the main pipe such that the axis of the branch pipe is at an angle of 60° with the axis of the main pipe, one of two facets of the hole of the main pipe is required to be formed at an angle of 30° with the axis of the main pipe, so that the inner periphery of the first facet becomes acute. On the other hand, if one of the two facets of the peaked edge of the opening of the branch pipe is required to be formed at an angle of 30° with the axis of the branch pipe, the inner periphery of the peaked edge becomes acute. As a result, the contact area of the first facets of the hole of the main pipe and the peaked edge of the opening of the branch pipe becomes far too large as compared with that of the second facets, so that the pressure to be applied to the joint in butt-welding decreases, especially if the first facets are very acute. Consequently, a bead is generated in the inner peripheries of the facets, as fused resin between the first facets of the hole of the main pipe and the peaked edge of the opening of the branch pipe stays within the inner peripheries, so that a burr is generated at the inner peripheries due to the resin pressure. In order to allow fluid to flow smoothly through the joint, it is required to remove the burr and smooth the inner surface of the pipes.

Next, a problem with the cutting apparatus for cutting pipes used in the method for making a joint between the main and branch pipes will be described. A conventional cutting apparatus for cutting pipes includes a base for fixing a pipe and a cutter, and either the base or the cutter is moved in a straight line. In such a conventional cutting apparatus, there is no difficulty in cutting a pipe in one direction. However, it is required to change the direction of the base versus the pipe to cut the pipe in a different direction after cutting it in one direction when the pipe is to be cut at two different directions in order to obtain a V-shaped edge of a hole or a peaked edge of an opening in the pipe. Therefore, it is required to move the base in an accurate manner to avoid cross cutting of the two cutting facets of different directions or deviation of cutting angle.

Next, problems with the butt-welding apparatus for butt-welding pipes by fusion, used in a method for making a joint between main and branch pipes will be described. One known method in the butt-welding methods by fusion, joins three synthetic resin pipes each of which is cut at an edge at an angle of 45 degrees. In this method, an L-shaped pipe is made by butt-welding two pipes by fusion, at their angular cut edges, and then the corner of the L-shaped pipe is cut at an angle of 45 degrees. Finally, the joint is made by butt-welding the cut opening of the remaining pipe to the cut corner of the L-shaped pipe. When a conventional butt-welding apparatus is used in this method, it is difficult to butt-weld the pipes in an angled direction, because the conventional butt-fusing apparatus is able to butt-fuse pipes only in a predetermined direction, that is a right angle. Additionally, different apparatuses are required for making joints having different shapes, so that the cost becomes high.

SUMMARY OF THE INVENTION

Accordingly, it is an object of this invention to provide a method for making a joint between a main pipe and a branch pipe in which the main and branch pipes having the same diameter are joined with predetermined joint strength which is not inferior to other portions of the pipes.

It is another object of this invention to provide a method for making a joint between a main pipe and a branch pipe in which a bead is easily removed.

It is further object of this invention to provide a method for making a joint between a main pipe and a branch pipe in which the appearance is excellent and strength of the butt-welding joint is sufficient.

It is still further object of this invention to provide a method for making a joint between a main pipe and a branch pipe in which the appearance is excellent and strength of the butt-welding joint is sufficient.

It is yet another object of this invention to provide a method for making a joint between a main pipe and a branch pipe in which a burr is not generated at the junction of the inner peripheries of a hole of the main pipe and the peaked edge of an opening of the branch pipe.

It is yet a still further object of this invention to provide a heating apparatus for heating pipes used in the method for making a joint between a main pipe and a branch pipe.

It is another object of this invention to provide a cutting apparatus for cutting pipes in more than two directions used in the method for making a joint between a main pipe and a branch pipe.

It is a further object of this invention to provide a butt-welding apparatus for butt-welding pipes by fusion used in the method for making a joint between a main pipe and a branch pipe.

According to the invention, a method for making a joint between a main pipe and a branch pipe having the same diameter includes the steps of cutting a main pipe to have a hole in the pipe wall so that two V-shaped edges of a right angle are formed in the diametrical positions on the periphery of the main pipe, cutting a branch pipe to have facets in the pipe opening so that the two peaked edges of a right angle are formed in the diametrical position on the periphery of the branch pipe, fusing the facets of the V-shaped edges of the hole of the main pipe and the peaked edges of the pipe opening of the branch pipe by heating, and butt-welding the facets of the V-shaped edges of the hole of the main pipe and the peaked edges of the pipe opening of the branch pipe to form a joint.

In the above method, neither blow molding nor drawing method is carried out, so that no thin part is generated in the main and branch pipes. Further, the operation does not require a high degree of skill such as is heeded with conventional welding, such that when the branch pipe is fixed to the main pipe a uniform fixing strength is obtained which is not inferior to any other parts when performed by an unskilled operator. Further, the stability property of the joint is excellent.

In order to make a joint between a main pipe and a branch pipe with increased accuracy, the method may include the steps of:

a cutting step of a main pipe including the steps of determining two points $e_1$ and $e_2$ which are located diametrically on the periphery of the main pipe, determining a point $f_1$ which is located to have an angle $\Theta_1$ ($<90°$) with the points $e_1$ and $e_2$ in the direction of the pipe axis and a right angle in the radius direction, determining a point $f_2$ which is located to have an angle $\Theta_2$ ($=90°-\Theta_2$) with the points $e_1$ and $e_2$ in the direction of the pipe axis (the same radius direction and opposite axial direction with $f_1$) and a right angle in the radius direction, and cutting the main pipe in a straight line and forming an arc connecting the points $e_1$, $f_1$ and $e_2$, an arc connecting the points $e_1$, $f_2$ and $e_2$ and V-shaped edges in the facets;

a cutting step of a branch pipe including the steps of determining two points $g_1$ and $g_2$ which are located diametrically on the periphery of the branch pipe, determining a point $h_1$ which is located to have the angle $\Theta_1$ with the points $g_1$ and $g_2$ in the direction of the pipe axis and at a right angle in the radius direction, determining a point $h_2$ which is located to have the angle $\Theta_2$ with the points $g_1$ and $g_2$ in the direction of the pipe axis (the opposite radius direction and same axial direction with $h_1$) and a right angle in the radius direction, and cutting the branch pipe in a straight line and forming an arc connecting the points $g_1$, $h_1$ and $g_2$, an arc connecting the points $g_1$, $h_2$ and $g_2$, and peaked edges in the facets.

In the above method, values of the angles $\Theta_1$ and $\Theta_2$ are determined arbitrarily as long as the conditions mentioned above are satisfied, so that it is possible to fix the branch pipe to the main pipe at an arbitrary angle.

According to another feature of the invention, a method for making a joint between a main pipe and a branch pipe includes the steps of cutting a main pipe to have a hole in the pipe wall so that two V-shaped edges of a right angle are formed in the diametrical positions on the periphery of the main pipe, cutting a branch pipe to have facets in the pipe opening so that two peaked edges of a slightly more acute angle than a right angle are formed in the diametrical positions on the branch pipe, fusing the facets of the V-shaped edges of the hole of the main pipe and the peaked edges of the pipe opening of the branch pipe by heating, and butt-welding the facets of the V-shaped edges of the hole of the main pipe and the peaked edges of the opening of the branch pipe to form a joint.

In the above method, the largest pressure is applied to the portion between the lowest point of the V-shaped edges of the main pipe and the peak of the peaked edges of the branch pipe when the fused V-shaped edges of the main pipe and the fused peaked edges of the branch pipe are butted under pressure in the direction of the axis of the branch pipe. Therefore, the fixing strength of the portion of the joint where the largest load may be applied and where water leakage easily occurs and becomes large, can be obtained with a high degree of accuracy while in the butting position.

In order to make a joint between a main pipe and a branch pipe with increased accuracy, the method may include the steps of:

a cutting step of a main pipe including the steps of determining two points $e_1$ and $e_2$ which are located diametrically on the periphery of the main pipe, determining a point $f_1$ which is located to have an angle $\Theta_3$ ($<90°$) with the points $e_1$ and $e_2$ in the direction of the pipe axis and a right angle in the radius direction, determining a point $f_2$ which is located to have an angle $\Theta_4$ ($=90°-\Theta_3$) with the points $e_1$ and $e_2$ in the direction of the pipe axis (the same radius direction and opposite axial direction with $f_1$) and a right angle in the radius direction, and cutting the main pipe in a straight line and forming an arc connecting the points $e_1$, $f_1$ and $e_2$, an arc connecting the points $e_1$, $f_2$ and $e_2$, and V-shaped edges in the facets;

a cutting step of a branch pipe including the steps of determining two points $g_1$ and $g_2$ which are located diametrically on the periphery of the branch pipe, determining a point $h_1$ which is located to have the angle $\Theta_3$ with the points $g_1$ and $g_2$ in the direction of the pipe axis and at a right angle in the radius direction, determining a point $h_2$ which is located to have the angle $\Theta_4$ with the points $g_1$ and $g_2$ in the direction of the pipe axis (the opposite radius direction and same axial direction with $h_1$) and at a right angle in the radius direction, determining points $i_1$ and $i_2$ which are a little distance from the points $g_1$ and $g_2$ in the direction of the pipe axis (the opposite axial direction of $h_1$ and $h_2$), and cutting the branch pipe in a straight line and forming an arc connecting the points $i_1$, $h_1$ and $i_2$, an arc connecting the points $i_1$, $h_2$ and $i_2$ and peaked edges in the facets.

According to another feature of the invention, a method for making a joint between a main pipe and a branch pipe includes the steps of cutting a main pipe to have a hole in the pipe wall so that two V-shaped edges of a right angle are formed in the diametrical positions on the periphery of the main pipe, cutting a branch pipe to have facets in the opening so that two peaked edges of a right angle are formed in the diametrical positions on the periphery of the branch pipe, fusing the facets of the V-shaped edges of the hole of the main pipe and the peaked edges of the opening of the branch pipe by heating, butt-welding the facets of the V-shaped edges of the hole of the main pipe and the peaked edges of the opening of the branch pipe in which a core has been inserted and is in contact with all the area of the inner surface of the peaked edges to form a joint, and removing a bead generated at the inner wall of the main pipe by a cutting tool inserted into the main pipe after pulling the core out of the branch pipe.

In the above method, the core is inserted into the branch pipe to contact all the inner surface of the peaked edges in the butt-welding process, so that deformation of the peaked edges of the branch pipe generated by stress and relaxation of the crystalline polymer material of which the pipe consists, is corrected. As a result, butting accuracy between the V-shaped edges of the main pipe and the peaked edges of the branch pipe is improved. Further, all of fused resin extruded from the joint between the facets of the main pipe and the branch pipe by pressing is extruded toward the main pipe due to presence of the core contacting all of the inner surface of the peaked edges of the branch pipe, so that a bead is generated only in the inner wall of the main pipe. Therefore, only a bead generated in the inner surface of the main pipe is to be removed.

According to another feature of the invention, a method for making a joint between a main pipe and a branch pipe includes the steps of cutting a main pipe to have a hole in the pipe wall so that two V-shaped edges of a right angle are formed in the positions slightly more shallow than the diametrical-positions on the periphery of the main pipe, cutting a branch pipe to have facets in the pipe opening so that two peaked edges at a right angle or at a slightly more acute angle than a right angle are formed in the diametrical positions on the periphery of the branch pipe, fusing the facets of the V-shaped edges of the hole of the main pipe and the peaked edges of the opening of the branch pipe by heating, and butt-welding the facets of the V-shaped edges of the hole of the main pipe and the peaked edges of the pipe opening of the branch pipe to form a joint.

In the above method, the lowest point of the V-shaped edges of the hole of the main pipe are located in the position slightly more shallow than the diametrical positions on the periphery of the main pipe, however, the hole of the main pipe becomes deeper as the fused resin of the periphery of the hole is extruded to the inside and outside by butt-welding the main and branch pipes under pressure so that the V-shaped edges of the main pipe are fitted to the peaked edges of the branch pipe. As a result, the width of the V-shaped edges of the main pipe becomes large and has almost the same width as the peaked edges of the branch pipe. Therefore, fused resin of the periphery of the hole and the peaked edges is extruded uniformly, so that a bead having a uniform thickness is generated in the butt-welding joint. Further, the peaked edges of the branch pipe are butt-welded and fixed to V-shaped edges of the hole of the main pipe adequately without sinking into the hole. After fixing, the width of the V-shaped edges of the main pipe and the peaked edges of the branch pipe becomes almost equal. Consequently, the butt-welding joint has excellent appearance and stable fixing strength.

According to another feature of the invention, a method for making a joint between a main pipe and a branch pipe includes the steps of cutting a main pipe to have a hole in the pipe wall so that a first main pipe facet provided at an angle more acute than 45° to the pipe axis and a second main pipe facet provided at a right angle to the first main pipe facet are formed in which the two facets meet at two points located diametrically on the periphery of the main pipe to make two V-shaped edges of a right angle, cutting a branch pipe to have facets in the opening so that a first branch pipe facet provided at an angle more acute than 45° to the pipe axis and a second branch pipe facet provided at a right angle to the first branch pipe facet are formed in which the two facets meet at two points located diametrically on the periphery of the branch pipe to make two peaked edges of a right angle, softening the facets of the V-shaped edges of the hole of the main pipe and the peaked edges of the opening of the branch pipe by heating, and butt-welding the facets of the V-shaped edges of the hole of the main pipe, and the peaked edges of the opening of the branch to form a joint, wherein the inner periphery of the first main pipe facet is provided at a right angle with the first main pipe facet and the inner periphery of the first branch pipe facet is provided at a right angle with the first branch pipe facet.

In the above method, the first main pipe facet and the first branch pipe facet contact each other at a relatively small area compared with the conventional one, when the edges of the hole of the main pipe and the opening of the branch pipe are butted. Therefore, the first main pipe facet and the first branch pipe facet are butt-welded with a higher pressure than the conventional method. Further, fused resin between the first main pipe facet and the first branch pipe facet is extruded to the inner and outer surfaces of the pipes, so that a burr on the inner peripheries of the first main pipe facet and the first branch pipe facet is not generated by resin pressure.

According to another feature of the invention, a heating apparatus includes a heater, a recessed attachment having a V-shaped recess of a right angle attached to the heater, and a peaked attachment having a peaked edge of a right angle attached to the heater.

When the heating apparatus is used for butt-welding the main and branch pipes by fusion, the peaked edge of the peaked attachment is fitted to the V-shaped edges of the main pipe, the V-shaped recess of the recessed attachment is fitted to the peaked edges of the branch pipe, and they are heated by the heater. All the areas of the V-shaped edges and the peaked edges are heated and fused simultaneously in one step, so that a uniform fusion can be obtained. The heating apparatus may include a recessed attachment having a V-shaped recess of an angle slightly acute than a right angle instead of a V-shaped recess of a right angle.

According to another feature of the invention, a cutting apparatus includes a base having a circular rail and a slit on a line crossing a center of the circular rail, a clamp which can to be fixed at an arbitrary point on the circular rail and can clamp a pipe whose axis lies in the radius direction of the circular rail, and a cutter can move along the slit and cut the pipe. The pipe held by the clamp is cut by the cutter moving alone the slit. After cutting the pipe, the pipe is cut again in different direction by moving the clamp along the circular rail to change the direction of the pipe. The direction of cutting can be changed arbitrarily by changing the fixing position of the clamp on the rail. Therefore, high accuracy is obtained in cutting a pipe from more than two directions by using the cutting apparatus.

According to another feature of the invention, a butt-welding apparatus includes a first supporting base and a second supporting base which can slide and move near to and far from each other, a heater which can be positioned between the first and second supporting bases, and a clamp which can rotate on each of the first and second supporting bases. When pipes are butt-welded by this butt-welding apparatus, a main pipe having a hole in the pipe wall and a branch pipe having an opening whose shape fits with the hole of the main pipe are clamped to each clamp. The mutual direction of the two pipes can be changed arbitrarily as the clamps can rotate on the supporting bases. The peripheries of the hole of the main pipe and the opening of the branch pipe are heated and fused by the heater positioned between the first and second supporting bases. The two pipes are moved and contact each other after removing the heater from the position between the two supporting bases. Then the two pipes are butt-welded at the fused peripheries under predetermined pressure. The two pipes are joined in the mutual direction of the supporting bases.

BRIEF DESCRIPTION OF THE DRAWINGS

This invention will be explained in more detail in conjunction with appended drawings, wherein:

FIGS. 6(a) and 6(b) are respectively a side view and a top view showing a joined pipe made by a method for making a joint between a main pipe and a branch pipe in a second preferred embodiment according to the invention.

FIGS. 7(a) and 7(b) are explanatory views illustrating the cutting step of a main pipe in the method for making a joint between a main pipe and a branch pipe in the second preferred embodiment according to the invention.

FIGS. 8(a) and 8(b) are explanatory views illustrating the cutting step of a branch pipe in the method for making a joint between a main pipe and a branch pipe in the second preferred embodiment according to the invention.

FIGS. 39(a), 39(b) and 39(c) are explanatory views illustrating the cutting step of a main pipe using the cutting apparatus in the first preferred apparatus embodiment according to the invention.

FIGS. 40(a), 40(b) and 40(c) are explanatory views illustrating the cutting step of a branch pipe using the cutting apparatus in the first preferred apparatus embodiment according to the invention.

FIG. 41 is a side view showing a joined pipe made by using the cutting apparatus in the first preferred apparatus embodiment according to the invention.

DESCRIPTION OF THE PREFERRED EMBODIMENT

First, a method for making a joint between a main pipe and a branch pipe in a first preferred embodiment and a heating apparatus in a first preferred embodiment will be explained in conjunction with FIGS. 1 to 5.

Figure 1A:
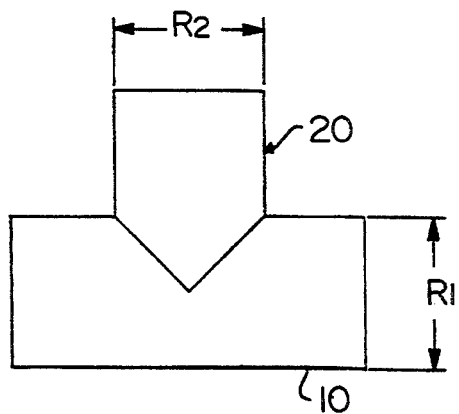
FIGS. 1(a) and 1(b) are respectively a front view and a side view showing a joined pipe to be made by a method for making a joint between a main pipe and a branch pipe in a first preferred embodiment according to the invention.
Figure 1B:
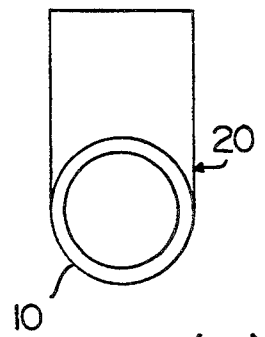

FIGS. 1(a) and 1(b) show a joined pipe to be made by the method for making a joint between a main pipe and a branch pipe in the first preferred embodiment. The joined pipe consists of a main pipe 10 and a branch pipe 20 both having the same diameter ($R_1=R_2$). The branch pipe 20 is fixed to the pipe wall of the main pipe 10 at a right angle. FIGS. 2 to 5 show the steps of the method. The method includes the steps of cutting the main pipe 10, cutting the branch pipe 20, fusing the pipes by heating and butt-welding the pipes. Either step of cutting the main pipe or cutting the branch pipe may be carried out first, or the two steps may be carried out simultaneously.

(the step of cutting the main pipe)

In this step, the main pipe 10 is cut to form a hole for branching in the pipe wall. The facet of the hole has two V-shaped edges 11 of a right angle in which the two lowest points are located diametrically on the periphery of the main pipe 10.

Figure 2A:
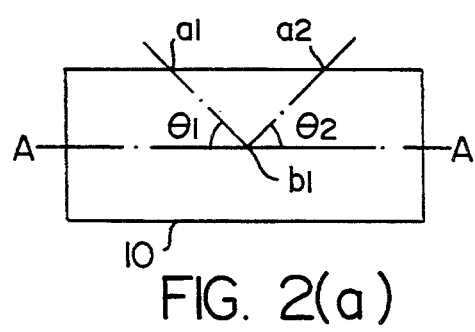
FIGS. 2(a) and 2(b) are explanatory views illustrating the cutting step of a main pipe in the method for making a joint between a main pipe and a branch pipe in the first preferred embodiment according to the invention.
Figure 2B:
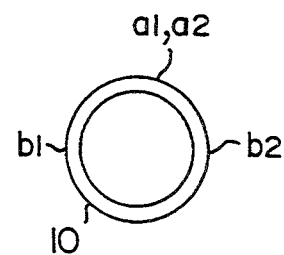

In more detail, as shown in FIGS. 2(a) and 2(b), the positions of four points $a_1$, $a_2$, $b_1$ and $b_2$ are determined on the periphery of the main pipe 10. The point $a_2$ is located at a distance equal to the outer diameter of the branch pipe 20 in the direction of the pipe axis A—A from the point $a_1$ whose position is determined arbitrary. The points $b_1$ and $b_2$ are located diametrically on the periphery of the main pipe 10, and located in the direction from the points $a_1$ and $a_2$ to make respectively an angle $\Theta_1$ ($=45°$) and an angle $\Theta_2$ ($=45°$) with the pipe axis A—A and an angle of 90° with the radius direction (in the opposite direction from each other). Then, an arc $b_1a_1b_2$ consisting of the three points $a_1$, $b_1$, and $b_2$ on the common plane is cut by a rotary cutter or a notched cutter from the point $a_1$ toward the points $b_1$ and $b_2$. In the same way, an arc $b_1a_2b_2$ consisting of the three points $a_2$, $b_1$ and $b_2$ on the common plane is cut from the point $a_2$ toward the points $b_1$ and $b_2$. Thus, the two V-shaped edges 11, 11 are made. In order to avoid crossing the cutting facets in the two directions at the points $b_1$ and $b_2$ due to over cutting, it is preferable to cut the pipe along a surface of a right angle notch of a board. Instead of using a rotary cutter or a notched cutter, a cutter having a right angle may be used to cut the pipe by stamping.

(the step of cutting the branch pipe)

In this step, the branch pipe 20 is cut to form a facet having two peaked edges 21 of a right angle in which two peaks are located diametrically on the periphery of the branch pipe 20.

Figure 3A:
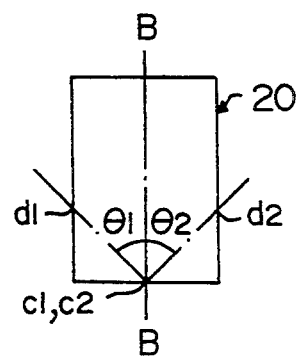
FIGS. 3(a) and 3(b) are explanatory views illustrating the cutting step of a branch pipe in the method for making a joint between a main pipe and a branch pipe in the first preferred embodiment according to the invention.
Figure 3B:
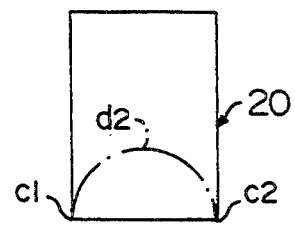

In more detail, as shown in FIGS. 3(a) and 3(b), positions of four points $c_1$, $c_2$, $d_1$ and $d_2$ are determined on the periphery of the branch pipe 20. The points $c_1$ and $c_2$ are located diametrically on the periphery of the branch pipe 20. The points $d_1$ and $d_2$ are located diametrically on the periphery of the branch pipe 20, and located in the direction from the points $c_1$ and $c_2$ to make respectively the angle $\Theta_1$ and the angle $\Theta_2$ with the pipe axis B—B and an angle of 90° with the radius direction (in the opposite direction from each other). Then, an arc $c_1d_1c_2$ consisting of the three points $c_1$, $c_2$, and $d_1$ on the common plane is cut from the point $d_1$ toward the points $c_1$ and $c_2$. In the same way, an arc $c_1d_2c_2$ consisting of the three points $c_1$, $c_2$ and $d_2$ on the common plane is cut from the point $d_2$ toward the points $c_1$ and $c_2$. Thus, the two peaked edges 21, 21 are made.

(the step of fusing the pipes by heating)

Figure 4:
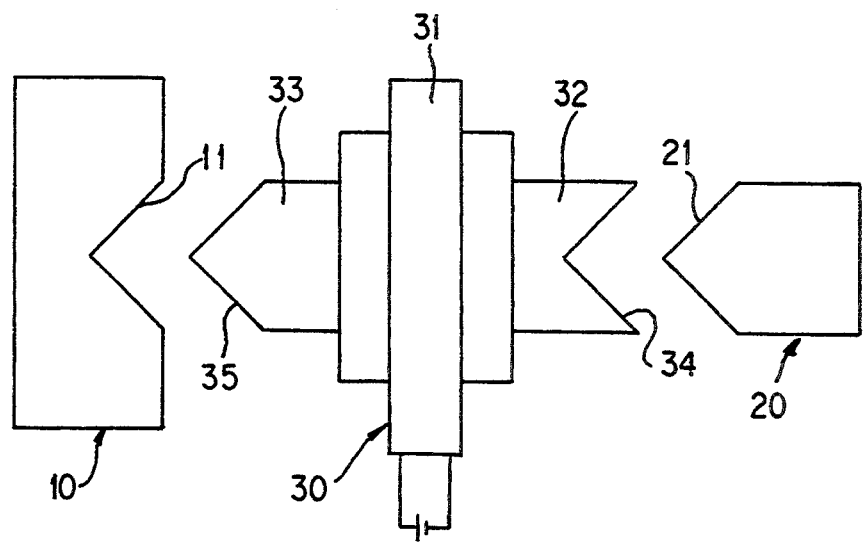
FIG. 4 is an explanatory view illustrating the heating step in the first preferred embodiment using a heating apparatus in a first preferred embodiment according to the invention.

In this step, the facet including the V-shaped edges 11 of the main pipe 10 and the facet including the peaked edges 21 of the branch pipe 20 are heated to be fused by a heating apparatus 30 in the first preferred embodiment. The heating apparatus 30 includes a heater 31, a recessed attachment 32 having a V-shaped recess 34 of a right angle attached to the heater 31, and a peaked attachment 33 having a peak 35 of a right angle, as shown in FIG. 4. The facets of the V-shaped edges 11 of the main pipe 10 and the peaked edges 21 of the branch pipe 20 are heated to be fused by fitting the V-shaped edges 11 and the peaked edges 21 to respectively the peak 35 of the peaked attachment 33 and the V-shaped recess 34 of the recessed attachment 32 under pressure for a predetermined period.

(the step of butt-welding the pipes)

Figure 5:
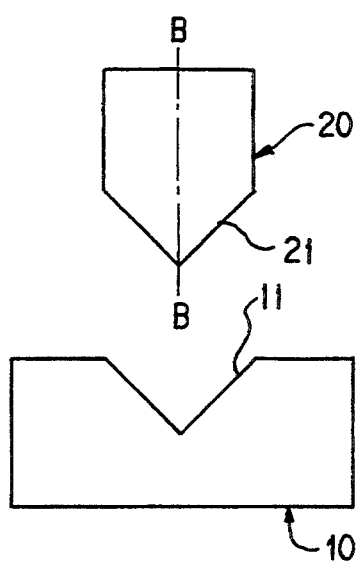
FIG. 5 is an explanatory view illustrating the butt-welding step in the method for making a joint between a main pipe and a branch pipe in the first preferred embodiment according to the invention.

In this step, the V-shaped edges 11 of the main pipe 10 and the peaked edges 21 of the branch pipe 20 are fitted by fusion and butt-welded to each other by applying pressure in the direction of the axis B—B of the branch pipe 20, as shown in FIG. 5.

As described above, in the method for making a joint between a main pipe and a branch pipe in the first preferred embodiment according to the invention, neither blow molding nor drawing method is carried out, so that the main and branch pipes do not have any thinner part than any other part. Further, the operation does not require high skill such as the conventional welding method, so that it is possible to fix the branch pipe 20 to the main pipe 10 with a stable fixing strength even by an operator who is not skilled. If the heating apparatus 30 in the first preferred embodiment is used in the step of heating the pipes, all areas of the facets of the V-shaped edges 11 and the peaked edges 21 to be fused and heated simultaneously, so that uniform fusion can be obtained. Consequently, a joined pipe in which a branch pipe is fixed to a main pipe with stable fixing strength is realized with an excellent quality.

Next, a method for making a joint between a main pipe and a branch pipe in a second preferred embodiment and a heating apparatus in a second preferred embodiment will be explained in conjunction with FIGS. 6 to 10.

FIGS. 6(a) and 6(b) show a joined pipe to be made by the method for making a joint between a main pipe and a branch pipe in the second preferred embodiment. The joined pipe consists of a main pipe 40 and a branch pipe 50 both having the same diameter ($R_4=R_5$). The branch pipe 50 is fixed to the pipe wall of the main pipe 40 at an angle of 60 degrees. FIGS. 6 to 10 show the steps of the method. The method includes the steps of cutting the main pipe, cutting the branch pipe, fusing the pipes by heating and butt-welding the pipes. Either step of cutting the main pipe or cutting the branch pipe may be carried out first, or the two steps may be carried out simultaneously.

(the step of cutting the main pipe)

In this step, the main pipe 40 is cut to form a hole for branching in the pipe wall. The facet of the hole has two V-shaped edges 41 of a right angle in which the two lowest points are located diametrically on the periphery of the main pipe 40.

In more detail, as shown in FIGS. 7(a) and 7(b), positions of four points $e_1$, $e_2$, $f_1$ and $f_2$ are determined on the periphery of the main pipe 40. The points $e_1$ and $e_2$ are located diametrically on the periphery of the main pipe 40. The points $f_1$ and $f_2$ are located on the common line parallel to the axis C—C of the main pipe 40, and located in the direction from the points $e_1$ and $e_2$ to make respectively an angle $\Theta_3$ ($=60°$) and an angle $\Theta_4$ ($=30°$) with the pipe axis C—C and at a right angle with the radius direction (in the opposite direction from each other). Then, an arc $e_1 f_1 e_2$ consisting of the three points $e_1$, $e_2$, and $f_1$ on the common plane is cut from the point $f_1$ toward the points $e_1$ and $e_2$. In the same way, an arc $e_1 f_2 e_2$ consisting of the three points $e_1$, $e_2$ and $f_2$ on the common plane is cut from the point $f_2$ toward the points $e_1$ and $e_2$. Thus, the two V-shaped edges 41, 41 are made.

(the step of cutting the branch pipe)

In this step, the branch pipe 50 is cut to form a facet having two peaked edges 51 of an angle slightly more acute than a right angle in which two peaks are located diametrically on the periphery of the branch pipe 50.

In more detail, as shown in FIGS. 8(a) and 8(b), positions of six points $g_1$, $g_2$, $h_1$, $h_2$, $i_1$ and $i_2$ are determined on the periphery of the branch pipe 50. The points $g_1$ and $g_2$ are located diametrically on the periphery of the branch pipe 50. The points $h_1$ and $h_2$ are located diametrically on the periphery of the branch pipe 50, and located in the direction from the points $g_1$ and $g_2$ to make respectively the angle $\Theta_3$ and the angle $\Theta_4$ with the pipe axis D—D and a right angle in the radius direction (in opposite direction each other). The point $i_1$ is located on the common line parallel to the pipe axis with the point $g_1$ with a slight distance (preferably equal to or shorter than 5 mm), while the point $i_2$ is located on the common line parallel to the pipe axis with the point $g_2$ with a slight distance. Then, an arc $i_1 h_1 i_2$ consisting of the three points $h_1$, $i_1$, and $i_2$ on the common plane is cut from the point $h_1$ toward the points $i_1$ and $i_2$. In the same way, an arc $i_1 h_2 i_2$ consisting of the three points $h_2$, $i_1$ and $i_2$ on the common plane is cut from the point $h_2$ toward the points $i_1$ and $i_2$. Thus, the two peaked edges 51, 51 are made.

(the step of fusing the pipes by heating)

Figure 9:
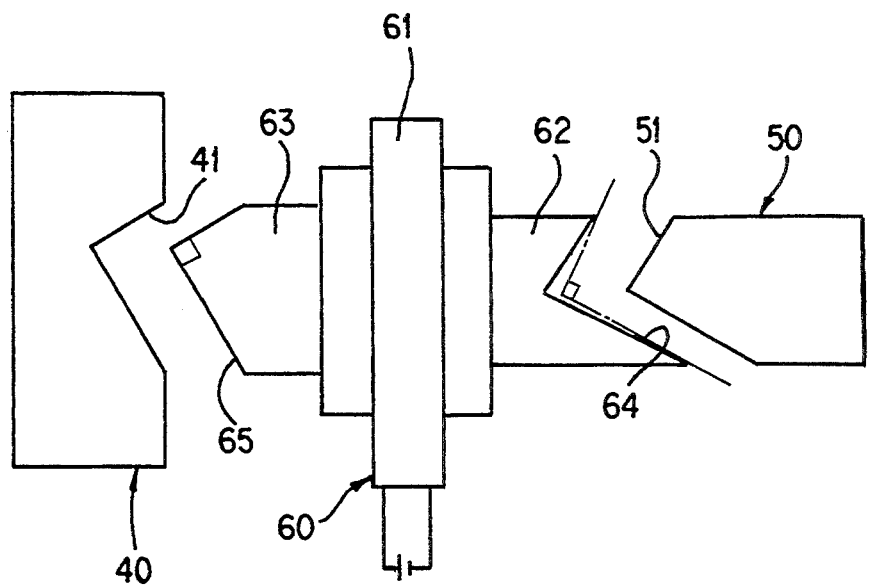
FIG. 9 is an explanatory view illustrating the heating step in the method for making a joint between a main pipe and a branch pipe in the second preferred embodiment using a heating apparatus in a second preferred embodiment according to the invention.

In this step, the facet including the V-shaped edges 41 of the main pipe 40 and the facet including the peaked edges 51 of the branch pipe 50 are heated to be fused by a heating apparatus 60 in the second preferred embodiment. The heating apparatus 60 includes a heater 61, a recessed attachment 62 having a V-shaped recess 64 of an angle slightly acute than a right angle attached to the heater 61, and a peaked attachment 63 having a peak 65 of a right angle, as shown in FIG. 9. The facets of the V-shaped edges 41 of the main pipe 40 and the peaked edges 51 of the branch pipe 50 are heated to be fused by fitting the V-shaped edges 41 and the peaked edges 51, respectively to the peak 65 of the peaked attachment 63 and the V-shaped recess 64 of the recessed attachment 62 under pressure for a predetermined period.

(the step of butt-welding the pipes)

Figure 10:
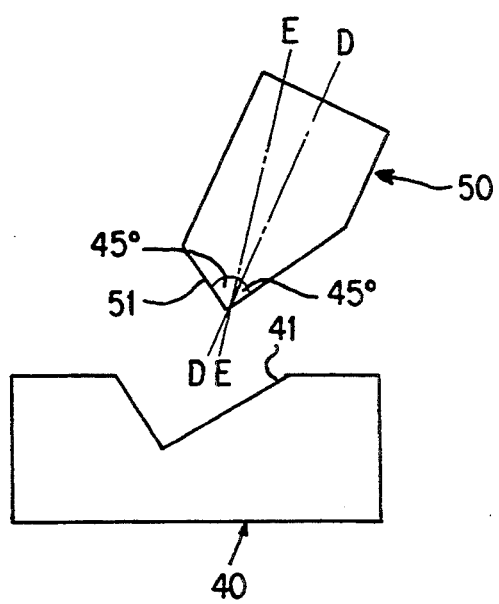
FIG. 10 is an explanatory view illustrating the butt-welding step in the method for making a joint between a main pipe and a branch pipe in the second preferred embodiment according to the invention.

In this step, the V-shaped edges 41 of the main pipe 40 and the peaked edges 51 of the branch pipe 50 are fitted by fusion and butt-welded to each other under equal application of pressure in the direction of the center of the V-shaped edges 41 of the main pipe 40 at an angle of 45° from either side of each V-shaped edge 41 (in the direction of line E—E), as shown in FIG. 10.

As described above, in the method for making a joint between a main pipe and a branch pipe in the second preferred embodiment according to the invention, neither blow molding nor drawing method is carried out, so that the main and branch pipes have no thinner part than any other parts. Further, the operation does not require a high degree of skill such as the conventional welding method, so that it is possible to fix the branch pipe 50 to the main pipe 40 with a stable fixing strength even by an operator who is not skilled. If the heating apparatus 60 in the second preferred embodiment is used in the step of heating the pipes, all area of the facets of the V-shaped edges 41 and the peaked edges 51 to be fused are heated simultaneously, so that a uniform fusion can be obtained. Consequently, a joined pipe in which a branch pipe is fixed to a main pipe with a stable fixing strength is realized with excellent quality. In the method in the second preferred embodiment, the facets of the V-shaped edges 41 of a right angle and the peaked edges 51 of an angle slightly more acute than a right angle are butted under pressure to be fixed by fusion in the butt-welding step, so that the largest pressure is applied to the part between the lowest points of the V-shaped edges 41 and the peaks of the peaked edges 51. Consequently, it is possible to obtain the greatest fixing strength in this part.

The method for making a joint between a main pipe and a branch pipe in the first and second preferred embodiments have been described above. However, concrete configurations of the invention are not limited to the embodiments, and modification in design may be included in the invention and remain within the gist the thereof. For example, the angle at which the branch pipe is fixed to the main pipe may have other values though the branch pipe is fixed to the main pipe at a right angle or an angle of 60° in the embodiments described above. In the method in the second preferred embodiment, if the branch pipe is fixed to the main pipe at an angle $\Theta$, then $\Theta_4 = \Theta/2$ and $\Theta_3 = 90° - \Theta_4$.

Figure 11:
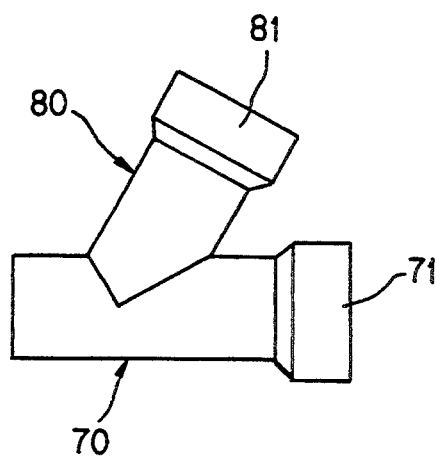
FIG. 11 is a side view showing another example of a joined pipe to be made by the method for making a joint between a main pipe and a branch pipe in the second preferred embodiment according to the invention.
Figure 12:
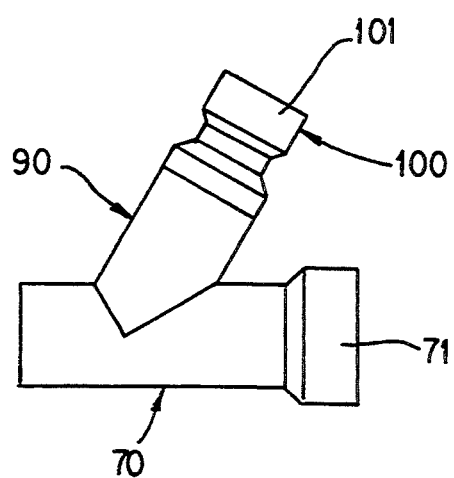
FIG. 12 is a side view showing another example of a joined pipe to be made by the method for making a joint between a main pipe and a branch pipe in the second preferred embodiment according to the invention.
Figure 13:
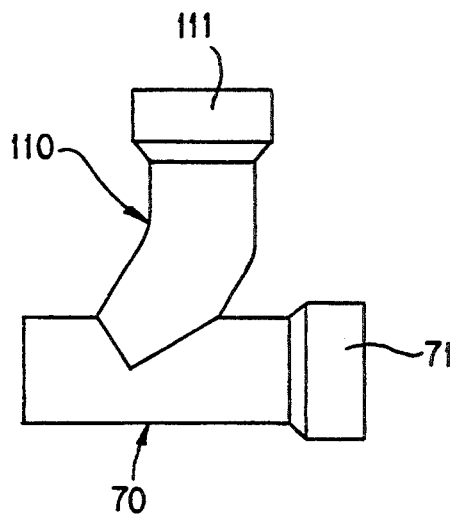
FIG. 13 is a side view showing another example of a joined pipe to be made by the method for making a joint between a main pipe and a branch pipe in the second preferred embodiment according to the invention.
Figure 14:
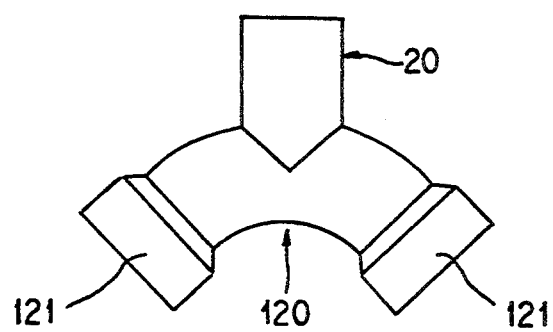
FIG. 14 is a side view showing another example of a joined pipe to be made by the method for making a joint between a main pipe and a branch pipe in the second preferred embodiment according to the invention.

Further, the main and branch pipes may be pipes having sockets or bent pipes for making a joined pipe, as shown in FIGS. 11 to 14. FIG. 11 shows a joined pipe using a main pipe 70 and a branch pipe 80 having sockets 71 and 81, made by integral molding with the main and branch pipes 70 and 80 in one opening, respectively. FIG. 12 shows a joined pipe using a main pipe 70 having a socket 71 made by integral molding with the main pipe 70 in one opening thereof and a branch pipe 90 having a socket 100 of an opening 101 having a diameter different from that of the socket 71 of the main pipe 70 butt-welded to the branch pipe 90. FIG. 13 shows a joined pipe using a main pipe 70 having a socket 71 made by integral molding with the main pipe 70 in one opening thereof and a branch pipe 110 of a bent pipe having a socket 111 made by integral molding with the branch pipe 110. FIG. 14 shows a joined pipe using a main pipe 120 of a bent pipe having sockets 121 made by integral molding with the main pipe 120 in both openings thereof.

Next, a method for making a joint between a main pipe and a branch pipe in a third preferred embodiment will be explained in conjunction with FIGS. 15 to 20. The method includes the steps of cutting the main pipe, cutting the branch pipe, fusing the pipes by heating, butt-welding the pipes and removing a bead. Either step of cutting the main pipe or cutting the branch pipe may be carried out first, or the two steps may be carried out simultaneously.

(the step of cutting the main pipe)

Figure 15:
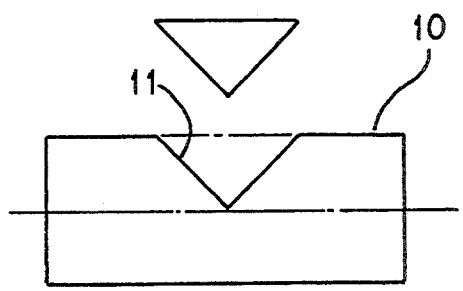
FIG. 15 is an explanatory view illustrating the cutting step of a main pipe in a method for making a joint between a main pipe and a branch pipe in a third preferred embodiment according to the invention.

In this step, the main pipe 10 is cut to form a hole for branching in the pipe wall, as shown in FIG. 15. The facet of the hole has two V-shaped edges 11 at a right angle in which the two lowest points are located diametrically on the periphery of the main pipe 10.

(the step of cutting the branch pipe)

Figure 16:
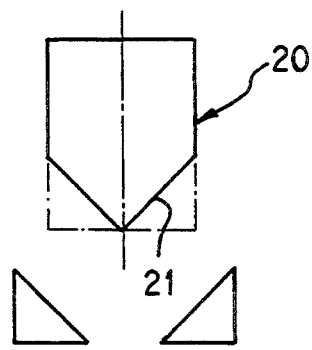
FIG. 16 is an explanatory view illustrating the cutting step of a branch pipe in the method for making a joint between a main pipe and a branch pipe in the third preferred embodiment according to the invention.

In this step, the branch pipe 20 is cut to form a facet having two peaked edges 21 at a right angle in which the two peaks are located diametrically on the periphery of the branch pipe 20, as shown in FIG. 16.

(the step of fusing the pipes by heating)

Figure 17:
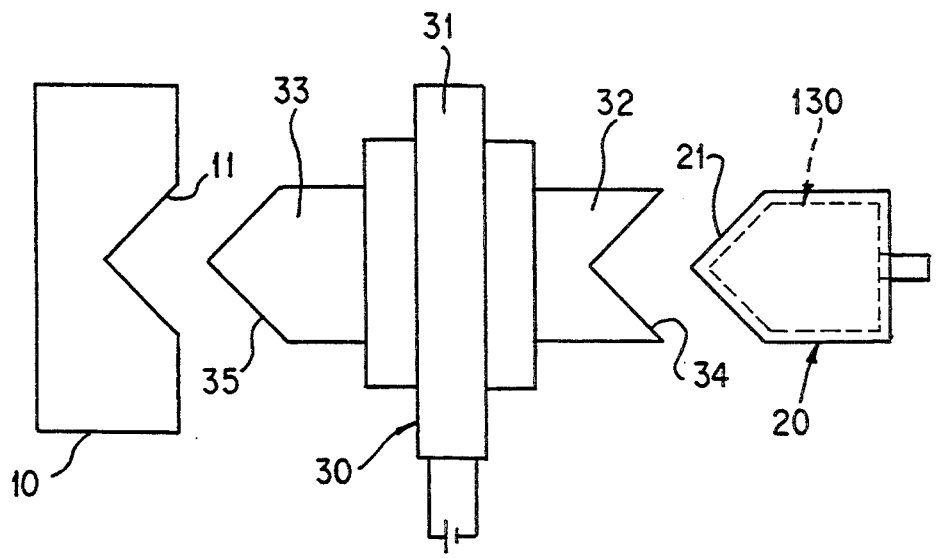
FIG. 17 is an explanatory view illustrating the heating step in the method for making a joint between a main pipe and a branch pipe in the third preferred embodiment according to the invention.

In this step, as shown in FIG. 17, the facet including the V-shaped edges 11 of the main pipe 10 and the facet including the peaked edges 21 of the branch pipe 20 are heated to be fused by a heating apparatus 30 in the first preferred embodiment. The heating apparatus 30 includes a heater 31, a recessed attachment 32 having a V-shaped recess 34 of a right angle attached to the heater 31, and a peaked attachment 33 having a peak 35 of a right angle, as shown in FIG. 4. The facets of the V-shaped edges 11 of the main pipe 10 and the peaked edges 21 of the branch pipe 20 in which a core 130 is inserted to contact with the inner surface thereof, are heated to be fused by fitting the V-shaped edges 11 and the peaked edges 21 respectively, to the peak 35 of the peaked attachment 33 and the V-shaped recess 34 of the recessed attachment 32, under pressure for a predetermined period.

The core 130 has a peaked edge at a right angle, like the peaked edges 21 of the branch pipe 20, and is located slightly back from the end of the peaked edge 21 in the branch pipe 20. It is preferable to make a clearance of about 0.25 mm on the average, between the outer surface of the core 130 and the inner surface of the branch pipe 20, thus the operation of inserting and pulling the core 130 in and out of the branch pipe 20 becomes easy. The core 130 may consist of rigid material such as metals or elastic materials such as natural rubber or synthetic rubber. However, it is preferable to plate the core 130 with chrome in the case of metals and to coat the core 130 with polytetrafluoro ethylene (Teflon: trade mark) in case of rubber. The core 130 may be a cylinder with or without a hollow center.

(the step of butt-welding the pipes)

Figure 18:
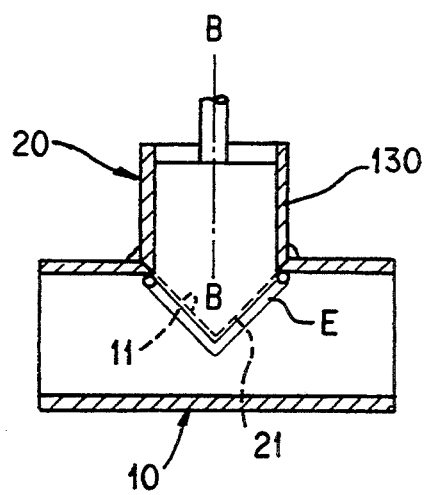
FIG. 18 is an explanatory view illustrating the butt-welding step in the method for making a joint between a main pipe and a branch pipe in the third preferred embodiment according to the invention.

In this step, the core 130 is moved toward the main pipe 10 so that the top of the core 130 passes slightly over the peak of the peaked edges 21 of the branch pipe 20, and the V-shaped edges 11 of the main pipe 10 and the peaked edges 21 of the branch pipe 20 are fitted by fusion and butt-welded to each other by applying pressure in the direction of the axis B—B of the branch pipe 20, as shown in FIG. 18.

(the step of removing a bead)

Figure 19:
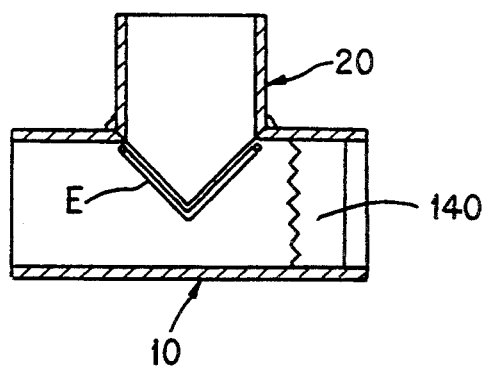
FIG. 19 is an explanatory view illustrating the removing step of a bead in the method for making a joint between a main pipe and a branch pipe in the third preferred embodiment according to the invention.
Figure 20:
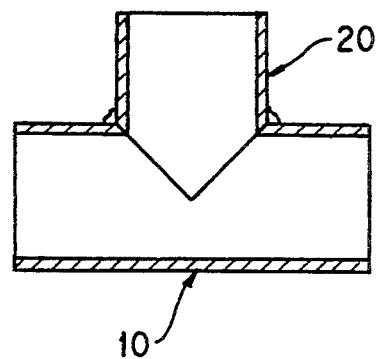
FIG. 20 is a cross-sectional view showing a joined pipe made by the method for making a joint between a main pipe and a branch pipe in the third preferred embodiment according to the invention.
Figure 21:
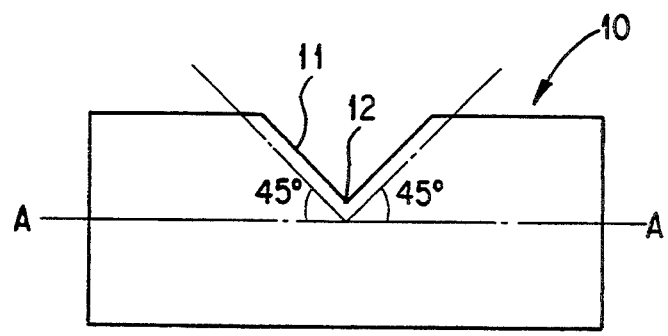
FIG. 21 is an explanatory view illustrating the cutting step of a main pipe in a method for making a joint between a main pipe and a branch pipe in a fourth preferred embodiment according to the invention.
Figure 22:
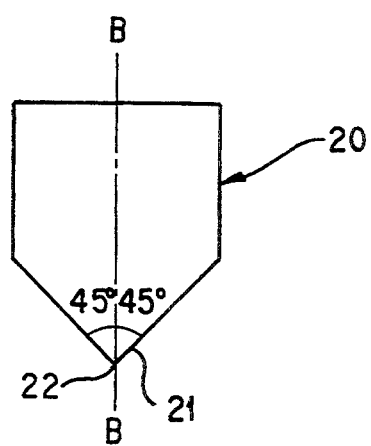
FIG. 22 is an explanatory view illustrating the cutting step of a branch pipe in the method for making a joint between a main pipe and a branch pipe in the fourth preferred embodiment according to the invention.

In this step, as shown in FIG. 19, the core 130 is removed from the branch pipe 20, and then a cutting tool 140 such as a rotary cutter or a reciprocal cutter (a rotary cutter is shown in FIG. 19) is inserted into the main pipe 10 to remove a bead E generated at the inner surface of the main pipe 10.

In the method described above, the inner surface of the peaked edges 21 of the branch pipe 20 is contacted with the core 130 in the steps of heating and butt-welding the pipes, deformation of the peaked edges 21 of the branch pipe 20 due to stress and relaxation of the crystalline polymer material of which the pipes consists, is corrected to obtain the proper shape. As a result, accuracy of butting between the facets of the peaked edges 21 and the V-shaped recess 34 of the recessed attachment 32 becomes improved in the step of heating the pipes, so that a uniform fusion can be obtained. Consequently, accuracy of butting between the facets of the V-shaped edges 11 of the main pipe 10 and the peaked edges 21 of the branch pipe 20 becomes improved in the step of butt-welding, so that a uniform fixing strength can be obtained in the joint. Further, as shown in FIG. 18, fused resin is extruded inside and outside of the pipes by the pressure applied in butting the facets of the V-shaped edges 11 of the main pipe 10 and the peaked edges 21 of the branch pipe 20. However, all the fused resin extruded to the inside of the pipes is forced toward the main pipe 10 as the inner surface of the peaked edges 21 of the branch pipe 20 is contacted with the core 130, and the bead E is generated only at the inner surface of the main pipe 10. Therefore, all the bead E in the pipes can be removed by removing the bead E generated in the inner surface of the main pipe 10 in the step of removing the bead. Additionally, in this method, neither blow molding nor drawing method is carried out, so that the main and branch pipes have no thinner part than any other part. Further, the operation does not require a high degree of skill such as the conventional welding method, so that it is possible to fix the branch pipe 20 to the main pipe 10 with a stable fixing strength even by an operator who is not skilled.

The method for making a joint between a main pipe and a branch pipe in the third preferred embodiment have been described above, however, concrete configurations of the invention are not limited to the embodiments, and modification in the design are included by the invention while remaining within the gist thereof. For example, the angle at which the branch pipe is fixed to the main pipe may have other values though the branch pipe is fixed to the main pipe at a right angle in the embodiment described above. Further, the main and branch pipes may be pipes having sockets or bent pipes for making a joined pipe. Additionally, if the root of the core is made of elastic material which can be easily folded, it is easy to position the core in the branch pipe by folding the root to touch the edge of the opening of the branch pipe and removing the core from the branch pipe by holding the elastic part and applying force.

Next, a method for making a joint between a main pipe and a branch pipe in a fourth preferred embodiment will be explained in conjunction with FIGS. 21 to 24. In this embodiment, a method for making a T-shaped joined pipe in which a branch pipe 20 is fixed to a main pipe 10 at a right angle will be described like that of the first preferred embodiment. The method includes the steps of cutting the main pipe, cutting the branch pipe, fusing the pipes by heating and butt-welding the pipes. Either step of cutting the main pipe or cutting the branch pipe may be carried out first, or the two steps may be carried out simultaneously.

(the step of cutting the main pipe)

In this step, the main pipe 10 is cut to form a hole for branching in the pipe wall. The facet of the hole has two V-shaped edges 11 at a right angle in which the two lowest points 12 are located at slightly more shallow points than the diametrical points on the periphery of the main pipe 10. Each of the two facets makes an angle of 45° with the pipe axis A—A.

(the step of cutting the branch pipe)

In this step, the branch pipe 20 is cut to form a facet having two peaked edges 21 at a right angle in which the two peaks 22 are located diametrically on the periphery of the branch pipe 10. Each of the two facets makes an angle of 45° with the pipe axis B—B.

(the step of fusing the pipes by heating)

Figure 23:
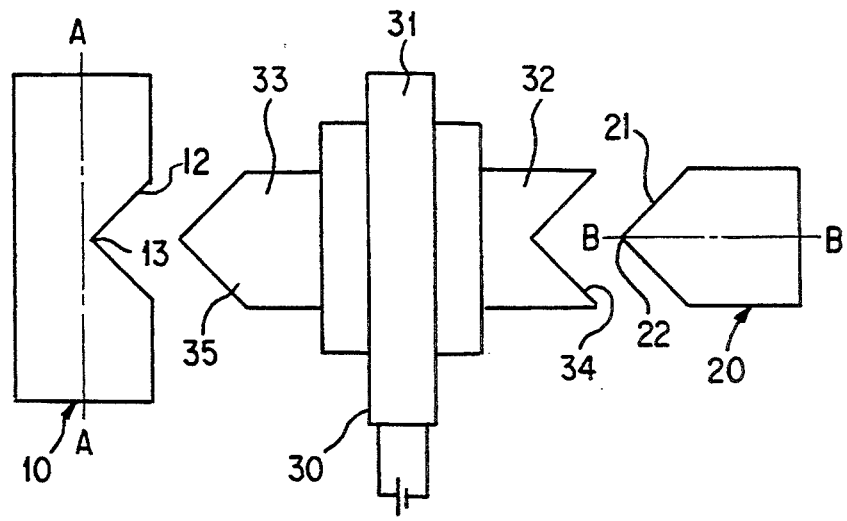
FIG. 23 is an explanatory view illustrating the heating step in the method for making a joint between a main pipe and a branch pipe in the fourth preferred embodiment according to the invention.

In this step, the facet including the V-shaped edges 11 of the main pipe 10 and the facet including the peaked edges 21 of the branch pipe 20 are heated to be fused by a heating apparatus 30 in the first preferred embodiment, as shown in FIG. 23. The facets of the V-shaped edges 11 of the main pipe 10 and the peaked edges 21 of the branch pipe 20 are heated to be fused by fitting the V-shaped edges 11 and the peaked edges 21 respectively to the peak 35 of the peaked attachment 33 and the V-shaped recess 34 of the recessed attachment 32 under pressure for a predetermined period.

(the step of butt-welding the pipes)

Figure 24:
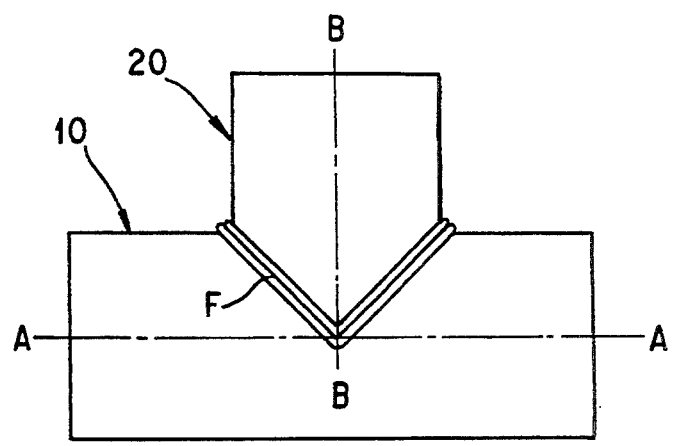
FIG. 24 is an explanatory view illustrating the butt-welding step in the method for making a joint between a main pipe and a branch pipe in the fourth preferred embodiment according to the invention.
Figure 25:
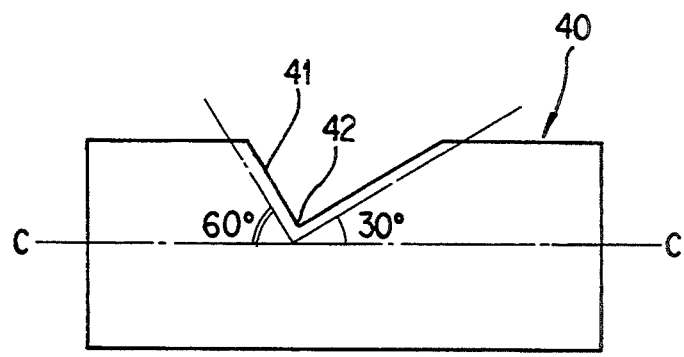
FIG. 25 is an explanatory view illustrating the cutting step of a main pipe in a method for making a joint between a main pipe and a branch pipe in a fifth preferred embodiment according to the invention.
Figure 26:
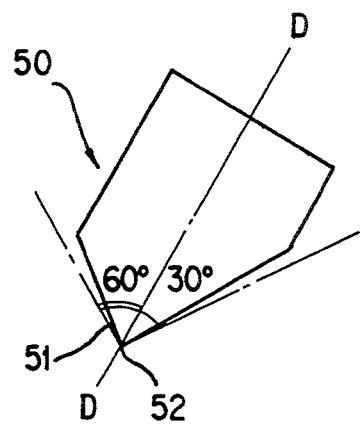
FIG. 26 is an explanatory view illustrating the cutting step of a branch pipe in the method for making a joint between a main pipe and a branch pipe in the fifth preferred embodiment according to the invention.

In this step, the V-shaped edges 11 of the main pipe 10 and the peaked edges 21 of the branch pipe 20 are fitted by fusion and butt-welded to each other by applying pressure in the direction of the axis B—B of the branch pipe 20, as shown in FIG. 24. The lowest points 12 of the V-shaped edges 11 are located at slightly more shallow points than the diametrical points. However, the V-shaped edges become deeper as fused resin within the V-shaped edges 11 is extruded to the inside and outside of the pipes by the pressure applied in the direction of the pipe axis B—B of the branch pipe 20. As a result, the width of the lowest points 12 of the V-shaped edges 11 becomes wider to be nearly that of the peaks 22 of the peaked edges 21, so that the peaked edges 21 of the branch pipe 20 and the V-shaped edges 11 of the main pipe 10 are butt-welded adequately without sinking of the peaked edges 21 into the V-shaped edges 11. Further, the pressure applied in the direction of the pipe axis B—B of the branch pipe 20 is dispersed uniformly between the V-shaped edges 11 and the peaked edges 21 in the radius direction, so that a bead F having uniform width is generated. After butt-welded, the lowest points 12 of the V-shaped 11 and that of the peaks 22 of the peaked edges 21 have almost the same width.

As described above, a bead F having uniform width is generated and the peaked edges 21 of the branch pipe 20 and the V-shaped edges 11 of the main pipe 10 are butt-welded adequately without sinking of the peaked edges 21 into the V-shaped edges 11, so that the joint has an excellent appearance. Further, the lowest points 12 of the V-shaped 11 and that of the peaks 22 of the peaked edges 21 have the almost same width, so that a joined pipe having a stable fixing strength can be made.

Next, a method for making a joint between a main pipe and a branch pipe in a fifth preferred embodiment will be explained in conjunction with FIGS. 25 to 28. In this embodiment, a method for making a Y-shaped joined pipe in which a branch pipe 50 is fixed to a main pipe 40 at an angle of 60° will be described as in the second preferred embodiment. The method includes the steps of cutting the main pipe, cutting the branch pipe, fusing the pipes by heating and butt-welding the pipes. Either step of cutting the main pipe or cutting the branch pipe may be carried out first, or the two steps may be carried out simultaneously.

(the step of cutting the main pipe)

In this step, the main pipe 40 is cut to form a hole for branching in the pipe wall. The facet of the hole has two V-shaped edges 41 at a right angle in which the two lowest points 42 are located at a slightly more shallow points than the diametrical points on the periphery of the main pipe 40. The two facets make respectively an angle of 30° and an angle of 60° with the pipe axis C—C.

(the step of cutting the branch pipe)

In this step, the branch pipe 50 is cut to form a facet having two peaked edges 51 of an angle slightly more acute than a right angle in which two peaks 52 are located diametrically on the periphery of the branch pipe 50. The two facets make respectively an angle of 30° and an angle of 60° with the pipe axis D—D.

(the step of fusing the pipes by heating)

Figure 27:
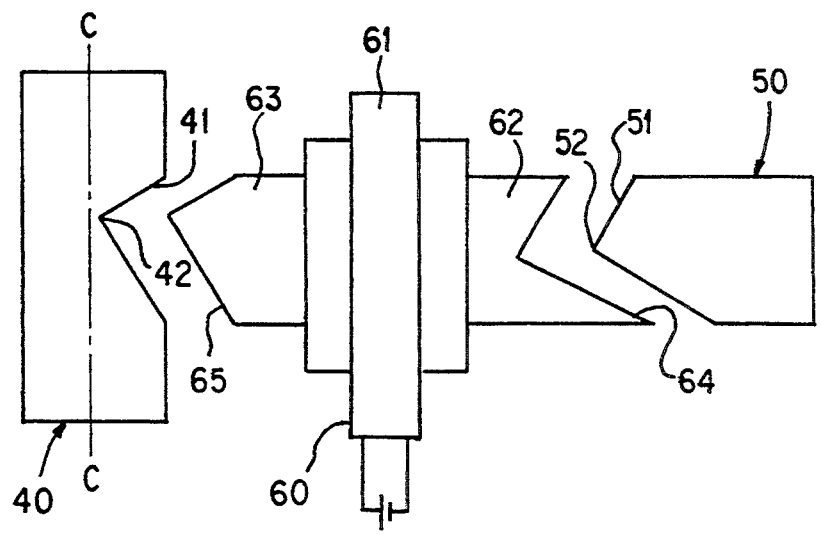
FIG. 27 is an explanatory view illustrating the heating step in the method for making a joint between a main pipe and a branch pipe in the fifth preferred embodiment according to the invention.

In this step, the facet including the V-shaped edges 11 of the main pipe 40 and the facet including the peaked edges 51 of the branch pipe 50 are heated to be fused by a heating apparatus 60 in the second preferred embodiment, as shown in FIG. 27. The facets of the V-shaped edges 41 of the main pipe 40 and the peaked edges 51 of the branch pipe 50 are heated to be fused by fitting the V-shaped edges 41 and the peaked edges 51 respectively to the peak 65 of the peaked attachment 63 and the V-shaped recess 64 of the recessed attachment 62 under pressure for a predetermined period.

(the step of butt-welding the pipes)

Figure 28:
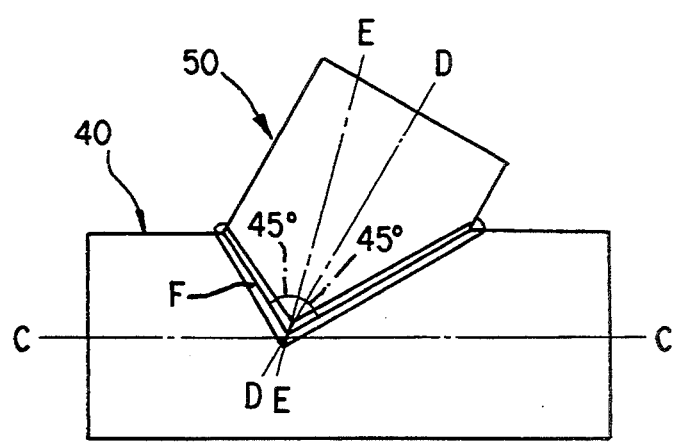
FIG. 28 is an explanatory view illustrating the butt-welding step in the method for making a joint between a main pipe and a branch pipe in the fifth preferred embodiment according to the invention.

In this step, the V-shaped edges 41 of the main pipe 40 and the peaked edges 51 of the branch pipe 50 are fitted by fusion and butt-welded to each other under equal application of pressure in the direction of the center of the V-shaped edges 41 of the main pipe 40 at an angle of 45° from either side of each V-shaped edge 41 (in the direction of line E—E), as shown in FIG. 28. The lowest points 42 of the V-shaped edges 41 are located at slightly more shallow points than the diametrical points. However, the V-shaped edges 41 become deeper as the fused resin within the V-shaped edges 41 is extruded to the inside and outside of the pipes by the pressure applied in the direction of the pipe axis D—D of the branch pipe 50. As a result, the width of the lowest points 42 of the V-shaped edges 41 becomes wider to be nearly that of the peaks 52 of the peaked edges 51, so that the peaked edges 51 of the branch pipe 50 and the V-shaped edges 41 of the main pipe 40 are butt-welded adequately without sinking of the peaked edges 51 into the V-shaped edges 41. After butt-welded, the lowest points 42 of the V-shaped 41 and that of the peaks 52 the peaked edges 51 have almost the same width.

In the method described above, the lowest points 42 of the V-shaped edges 41 of a right angle and the peaks 52 of the peaked edges 51 of an angle slightly more acute than a right angle are butt-welded by pressure, so that the largest pressure is applied between the lowest points 42 of the V-shaped edges 41 and the peaks 52 of the peaked edges 51. As a result, it is possible to obtain the largest strength in fixing by fusion in the part where the largest load may be applied and water leakage may easily occur, though the bead F becomes slightly wide as it goes toward the lowest points 42 and the peaks 52.

The method for making a joint between a main pipe and a branch pipe in the fourth and fifth preferred embodiments have been described above, however, concrete configurations of the invention are not limited to the embodiments, and modification in design is included by the invention while remaining within the gist thereof. For example, the angle at which the branch pipe is fixed to the main pipe may have other values though the branch pipe is fixed to the main pipe at a right angle or an angle of 60° in the embodiments described above, or the joined pipe to be made by the method may have more than two branch pipes. Further, the peaked edges may have a right angle instead of an angle slightly more acute than a right angle as in the fourth embodiment.

Next, the disadvantage of a conventionally joined pipe and a method for making a joint between a main pipe and a branch pipe in a sixth preferred embodiment, will be explained in conjunction with FIGS. 29 to 33.

Figure 29:
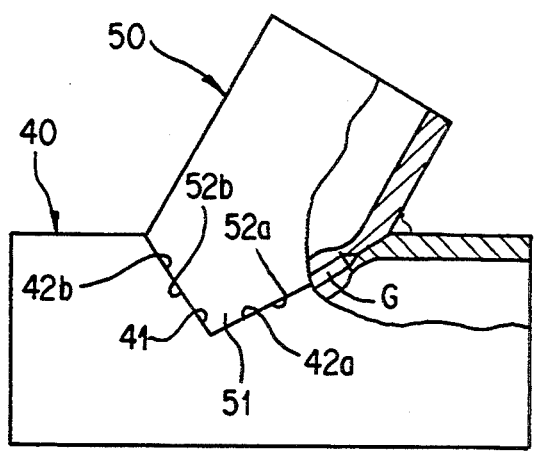
FIG. 29 is a partially cutaway side view showing a joined pipe made by the conventional method for making a joint between a main pipe and a branch pipe.

As shown in FIG. 29, when a branch pipe 50 is to be fixed to a main pipe 40 at an angle of 60° to form a joined pipe, a first main pipe facet 42a is required to be formed in the main pipe 40 at an angle of 30° with the pipe axis of the main pipe 40, while a first branch pipe facet 52a is required to be formed in the branch pipe 50 at an angle of 30° with the pipe axis of the branch pipe 50. As a result, the first main pipe facet 42a and the first branch pipe facet 52a have acute inner peripheries. Therefore, the contact area between the first main pipe facet 42a and the first branch pipe facet 52a becomes larger as compared with that between a second main pipe facet 42b and a second branch pipe facet 52b, so that the pressure applied in the butt-welding step decreases especially at the inner peripheries of the first main pipe facet 42a and the first branch pipe facet 52a. Consequently, fused resin between the first main pipe facet 42a and the first branch pipe facet 52a remain there and makes a bead G, and there generates a burr by resin pressure. Such a disadvantage is resolved by the method in the six preferred embodiment.

The method includes the steps of cutting the main pipe, cutting the branch pipe, fusing the pipes by heating and butt-welding the pipes. Either step of cutting the main pipe or cutting the branch pipe may be carried out first, or the two steps may be carried out simultaneously.

(the step of cutting the main pipe)

Figure 30:
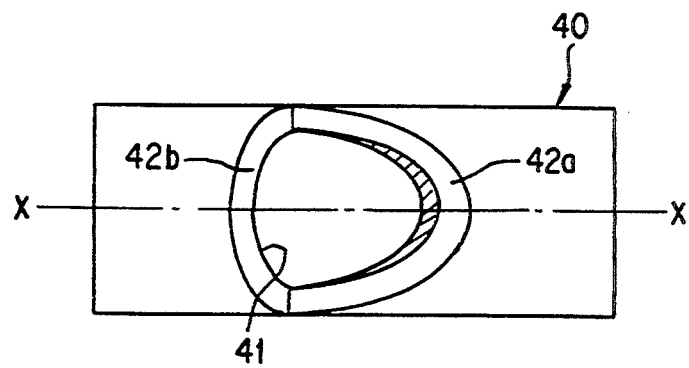
FIG. 30 is an explanatory view illustrating the cutting step of a main pipe in a method for making a joint between a main pipe and a branch pipe in a sixth preferred embodiment according to the invention.
Figure 31:
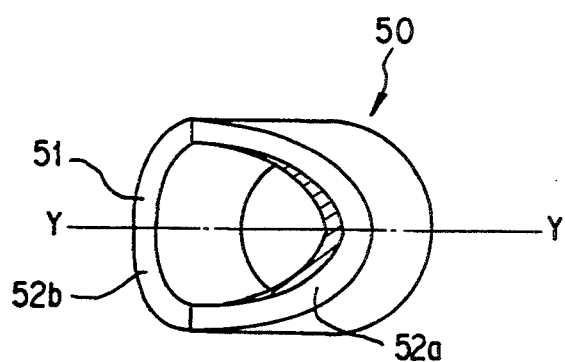
FIG. 31 is an explanatory view illustrating the cutting step of a branch pipe in the method for making a joint between a main pipe and a branch pipe in the sixth preferred embodiment according to the invention.

In this step, as shown in FIG. 30, the main pipe 40 is cut to form a hole for branching, in the pipe wall. A first main pipe facet 42a and a second main pipe facet 42b of the hole makes two V-shaped edges 41 at a right angle in which the two lowest points are located diametrically on the periphery of the main pipe 40. The first and second main pipe facets 42a and 42b make respectively, an angle of 30° and an angle of 60° with the pipe axis X—X. Then, the inner periphery of the first main pipe facet 42a is cut at a right angle with the first main pipe facet 42a. It is preferable to cut the inner periphery so that the first main pipe facet 42a has the width equal to the wall thickness of the branch pipe 50. An area of oblique lines in FIG. 30 indicates the part of the inner periphery to be preferably cut.

(the step of cutting the branch pipe)

In this step, the branch pipe 50 is cut to form facets having two peaked edges 51 of a right angle in which the two peaks are located diametrically on the periphery of the branch pipe 50. A first branch pipe facet 52a and a second branch pipe facet 52b of the peaked edges 51 make respectively an angle of 30° and an angle of 60° with the pipe axis Y—Y. Then, the inner periphery of the first branch facet 52a is cut at a right angle with the first branch pipe facet 52a. It is preferable to cut the inner periphery so that the first branch pipe facet 52a has a width equal to the wall thickness of the branch pipe 50. The oblique lines in FIG. 31 indicates the part of the inner periphery to be preferably cut.

(the step of fusing the pipes by heating)

Figure 32:
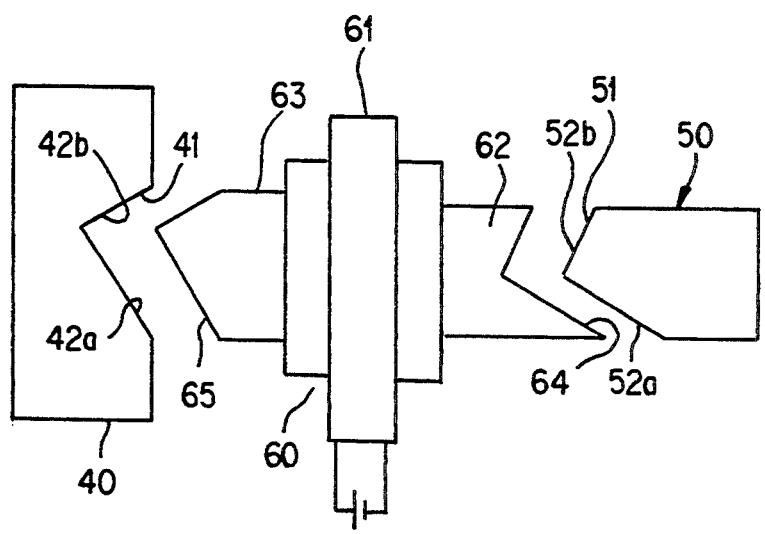
FIG. 32 is an explanatory view illustrating the heating step in the method for making a joint between a main pipe and a branch pipe in the sixth preferred embodiment according to the invention.

In this step, the facet including the V-shaped edges 41 of the main pipe 40 and the facet including the peaked edges 51 of the branch pipe 50 are heated to be fused by a heating apparatus 60 in the second preferred embodiment, as shown in FIG. 32. The facets of the V-shaped edges 41 of the main pipe 40 and the peaked edges 51 of the branch pipe 50 are heated to be fused by fitting the V-shaped edges 41 and the peaked edges 51 respectively, to the peak 65 of the peaked attachment 63 and the V-shaped recess 64 of the recessed attachment 62 under pressure for a predetermined period.

(the step of butt-welding the pipes)

Figure 33:
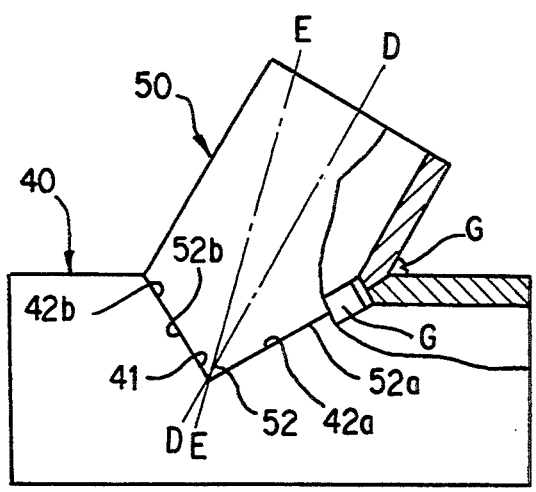
FIG. 33 is an explanatory view illustrating the butt-welding step in the method for making a joint between a main pipe and a branch pipe in the sixth preferred embodiment according to the invention.

In this step, the V-shaped edges 41 of the main pipe 40 and the peaked edges 51 of the branch pipe 50 are fitted by fusion and butt-welded to each other under equal application of pressure in the direction of the center of the V-shaped edges 41 of the main pipe 40 at an angle of 45° from either side of each V-shaped edge 41 (in the direction of line E—E), as shown in FIG. 33. The first main pipe facet 42a and the first branch pipe facet 52a are contacted at narrower area compared to the conventional joined pipe, so that high pressure is applied thereto. As a result, fused resin between the first main pipe facet 42a and the first branch pipe 52a is extruded by high pressure to the inner and outer surfaces of the pipes to form a bead G, so that the generation of a burr at the inner periphery of the first main pipe facet 42a and the first branch pipe facet 52a due to resin pressure may be avoided.

The method for making a joint between a main pipe and a branch pipe in the fourth and fifth preferred embodiments have been described above, however, concrete configurations of the invention are not limited to the embodiments, and modification in design may be included in the invention while remaining within the gist thereof. For example, the angle at which the branch pipe is fixed to the main pipe may have other values though the branch pipe is fixed to the main pipe at an angle of 60° in the embodiment described above, or the joined pipe to be made by the method may have more than two branch pipes. Further, the peaked edges may have a right angle instead of an angle slightly acute than a right angle to increase the pressure applied to the peaks of the V-shaped edges and the peaks of the peaked edges in the butt-welding step. Consequently, it is possible to obtain the largest fixing strength at the part to which the largest pressure is applied.

Figure 34:
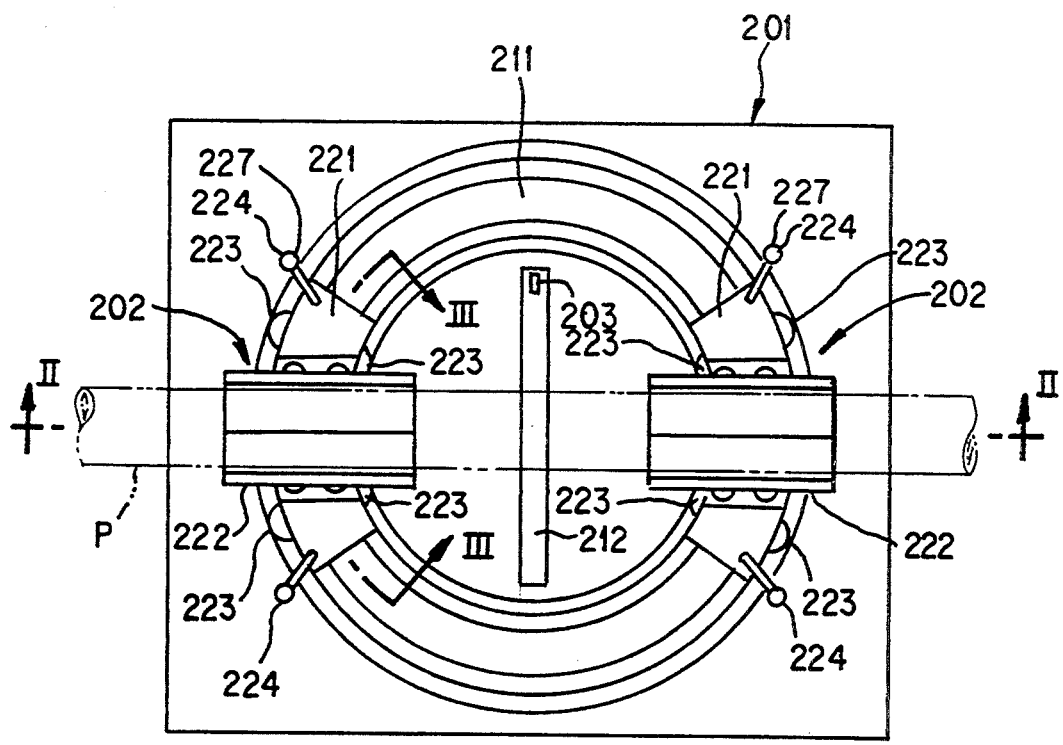
FIG. 34 is a top view showing a cutting apparatus in a first preferred embodiment according to the invention.
Figure 35:
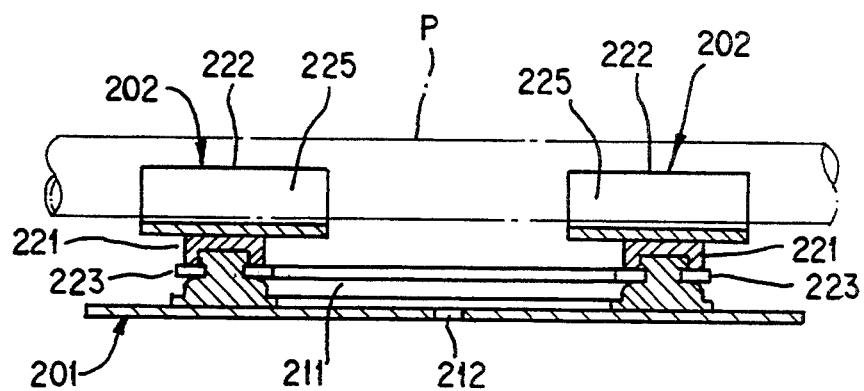
FIG. 35 is a cross-sectional view taken on line II—II of FIG. 34.
Figure 36:
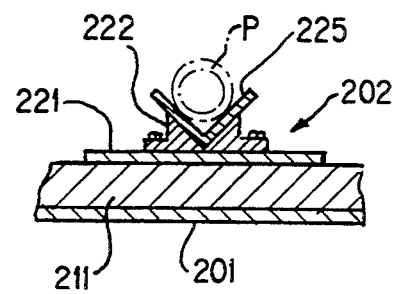
FIG. 36 is a cross-sectional view taken on line III—III of FIG. 34.
Figure 37:
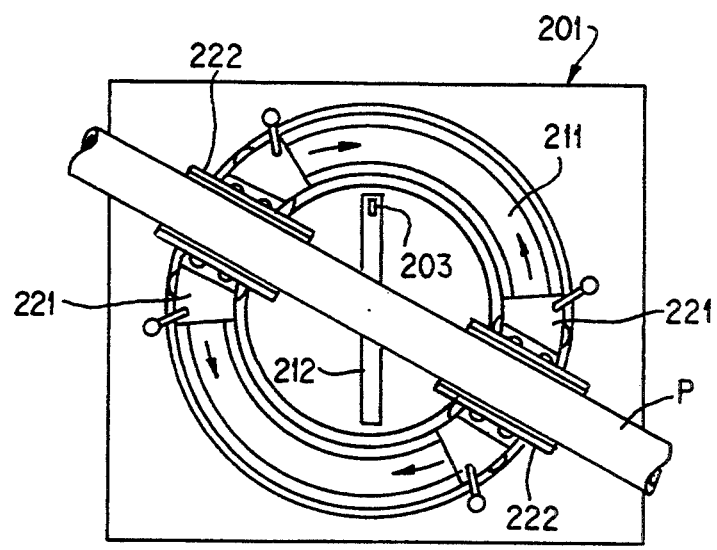
FIG. 37 is a top view showing a cutting apparatus in the first preferred apparatus embodiment according to the invention.
Figure 38:
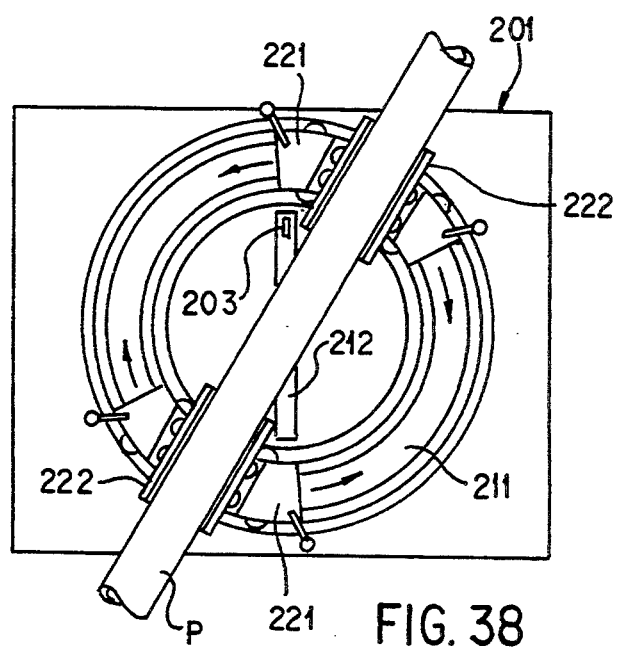
FIG. 38 is a top view showing a cutting apparatus in the first preferred apparatus embodiment according to the invention.

Next, a cutting apparatus in a first preferred embodiment will be described. First, the structure of the cutting apparatus will be described in conjunction with FIGS. 34 to 38. FIGS. 34, 37 and 38 are top views of the cutting apparatus. FIG. 35 is a cross-sectional view taken along line II—II, and FIG. 36 is a cross-sectional view taken along line III—III.

The cutting apparatus includes a base 201. The base 201 is provided with a circular rail 211 and a slit 212 having a length slightly shorter than the diameter of the circular rail 211 on a line passing the circle center. Two clamps 202, 202 are provided on the circular rail 211. Each clamp 202 includes a bed 221 allowed to slide along the circular rail 211 and a cradle 222 fixed on the top surface of the bed 221. The bed 221 includes four rollers 223 for smooth sliding of the bed 221 on the circular rail 211 in the four corners, and four stoppers for stopping the clamp. Each stopper 224 includes a handle 225 and a cam (not shown in FIGS.) which is provided at the tip of the handle 225 in which the cam rotates between the bed 221 and the circular rail 211 by rotating the handle 225. Each cradle 222 has a V-shaped recess 225 for holding a pipe P in the radius direction of the circular rail 211 on the top surface.

As shown in FIGS. 37 and 38, the pipe P clamped by the clamps 202, 202 is allowed to change its direction by sliding the clamps along the circular rail 211. If the pipe P is a straight pipe, the clamps 202, 202 are located diametrically on the circular rail 211.

A cutter 203 fixed to a moving mechanism (not shown in FIGS.) is provided within the slit 212. The cutter 203 is allowed to cut the pipe P clamped by the clamps 202 as it moves along the slit 212. The cutter 203 may be a notched straight cutter allowed to cut the pipe P by reciprocal motion in a vertical direction or a rotary notched cutter allowed to cut the pipe P by rotational motion. The moving mechanism is selected in response to the type of the cutter 203. It is preferable to select a moving mechanism by which the cutter 203 is able to move reciprocally within the slit 212.

Next, the method for cutting a pipe by the cutting apparatus will be described. FIG. 39 shows a process for cutting the pipe P to make a main pipe (a) of a joined pipe having a V-shaped hole. FIG. 40 shows a process for cutting the pipe P to make a branch pipe (b) of a joined pipe having a peaked edge, and FIG. 41 shows a joined pipe consisting of the main and branch pipes (a) and (b) cut by the cutting apparatus.

When the pipe P is cut from two directions, as shown in FIGS. 39 and 40, the pipe P is clamped at two positions by the two clamps 202, 202, and then the clamps 202, 202 are fixed to the circular rail 211 so that the part of the pipe P to be cut is located crossing just above the slit 212. The position of the two clamps 202, 202 are determined in response to the direction of the cutting angle of the pipe P. Then, the pipe wall of the pipe P is cut to reach the predetermined position included in the center plane (x) including the pipe axis, as the cutter 203 moves along the slit 212. The direction of the pipe P is changed by moving the clamps 202 along the circular rail 211, and the pipe wall of the pipe P is cut to reach the predetermined position in the center plane (x) including the pipe axis as the cutter 203 moves along the slit 212. Thus, the V-shaped hole is generated in the pipe P.

As shown above, it is possible to change the direction of the pipe P by moving the clamps 202 along the circular rail 211 without changing the directions of the cutter 203 and the base 201, so that the error of the cutting angle becomes small and the crossing of cutting facets due to over cutting can be avoided when the pipe P is cut from more than two directions. With such a high cutting accuracy, uniform pressure for fusion can be obtained in butt-welding the facets of the main pipe (a) and the branch pipe (b) to make a joined pipe, so that a joined pipe with excellent quality is realized, as shown in FIG. 39. Further, the cutting direction of the pipe is set in a desired direction in the cutting apparatus, so that it is possible to cut the pipe to make a V-shaped edge or a peaked edge having any desired angle (any angle of 30°, 45°, 60°, 90°, 120°, for example).

Figure 42:
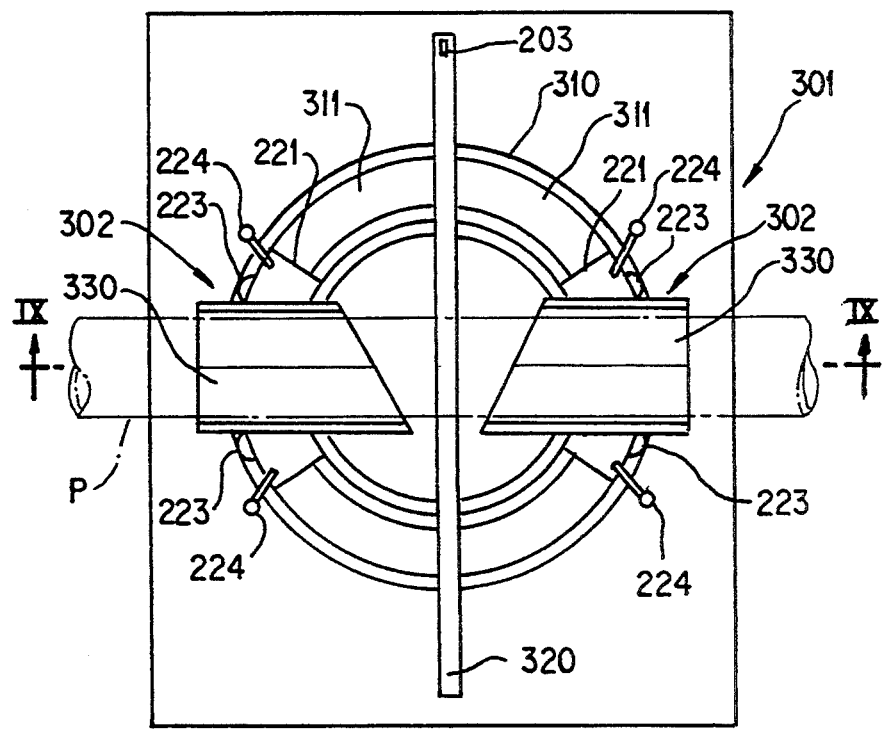
FIG. 42 is a top view showing a cutting apparatus in a second preferred apparatus embodiment according to the invention.
Figure 43:
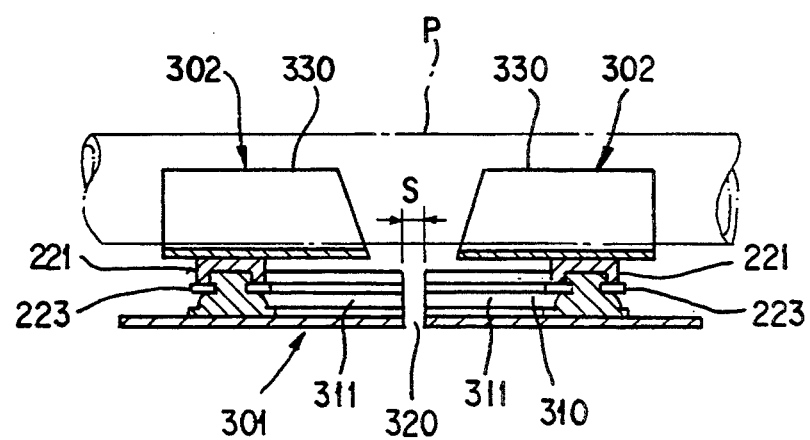
FIG. 43 is a cross-sectional view taken on line IX—IX of FIG. 42.

Next, a cutting apparatus in a second preferred embodiment will be described in conjunction with FIGS. 42 and 43. The like parts as in the first embodiment are indicated as like reference numerals and will not be explained again in this embodiment.

The cutting apparatus includes a base 301. The base 301 is provided with a circular rail 310 and a slit 320 longer than the diameter of the circular rail 310 on a line passing the circle center. The circular rail 310 is divided to two arc rails 311, 311 by the slit 320 with a distance S through which a cutter 203 is able to pass. The cutter 203 is fixed to a moving mechanism (not shown in FIGS.) and allowed to cut the pipe P as it moves along the slit 320. A clamp 302 is provided on each arc rail 311. Each clamp 302 includes a cradle 330 having a wide width and an oblique facet facing toward the circle center.

In the cutting apparatus, the cradle 330 is wide and the cutter 203 is allowed to move with a large stroke, so that it is possible to clamp and cut a pipe P having a large diameter as compared with the one in the first embodiment. Further, the facet of the cradle 330 facing toward the circle center is made oblique, so that the cradle 330 may not lie over the slit 320 and obstruct the motion of the cutter 203 when the pipe P is cut at an acute angle with the pipe axis.

The cutting apparatus in the first and second preferred embodiments have been described above, however, concrete configurations of the invention are not limited to the embodiments, and any modification in design is included by the invention while remaining within the gist thereof. For example, the cutter driven by the moving mechanism moves and the base is fixed in the embodiments, however, the base may be provided so as to move while the cutter is fixed, or the base and the cutter may be moved mutually. Further, the base or the rail may have a scale indicating the cutting angle or length, or the cutting apparatus may have a controlling circuit which stops the motion of the cutter automatically to improve cutting accuracy. Additionally, the clamp may be allowed to be exchanged by another in response to the diameter or length of the pipe.

Figure 44:
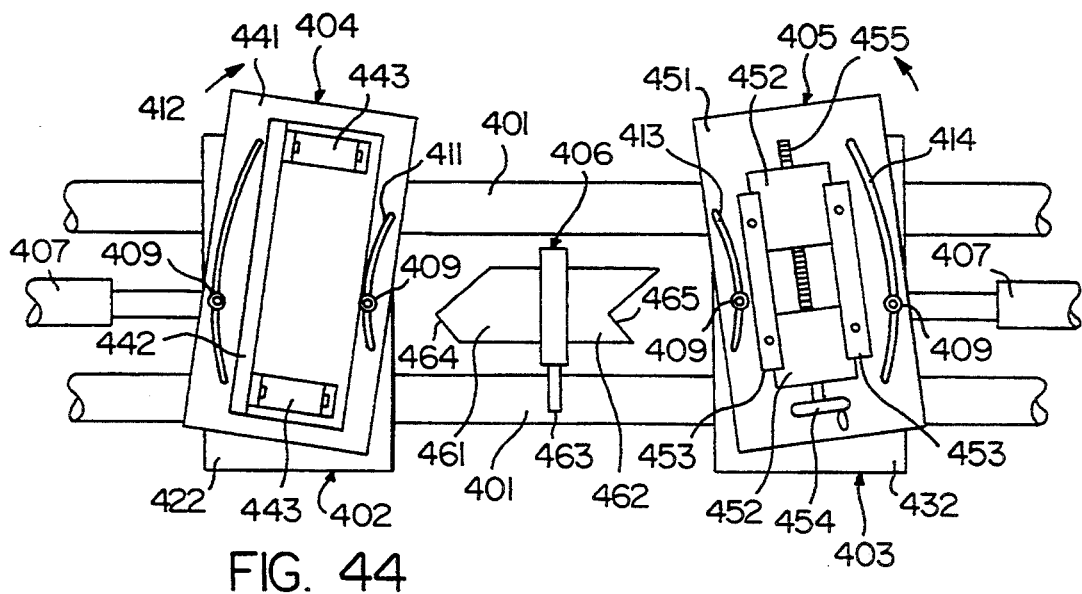
FIG. 44 is a top view showing a butt-welding apparatus in a preferred embodiment according to the invention.
Figure 45:
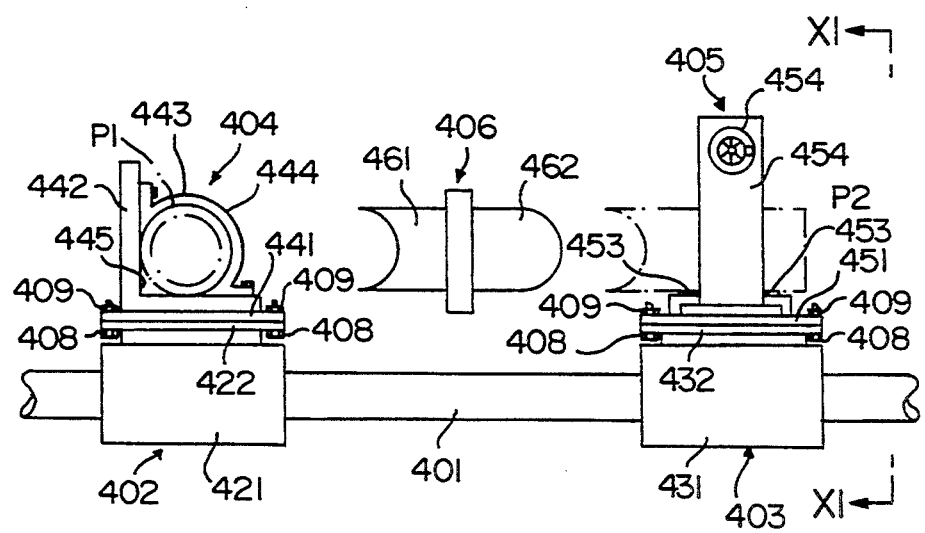
FIG. 45 is a side view showing a butt-welding apparatus in a preferred embodiment according to the invention.
Figure 46:
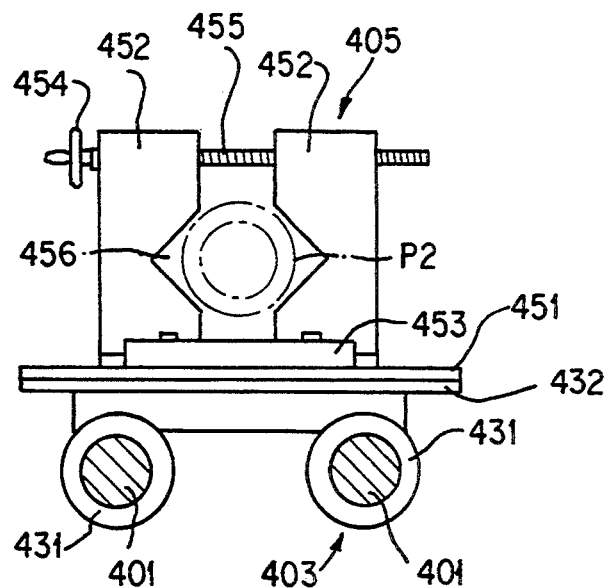
FIG. 46 is a cross-sectional taken on line XI—XI of FIG. 45.

Next, a butt-welding apparatus in a preferred embodiment will be described in conjunction with FIGS. 44 to 49. FIGS. 44 and 45 are respectively a top view and a side view of the butt-welding apparatus, and FIG. 46 is a cross-sectional view taken along line XI—XI of FIG. 45.

The butt-welding apparatus includes a guide rail 401, first and second cradles 402 and 403, first and second clamps 404 and 405, and a heater 406.

The guide rail 401 consists of two parallel rods on which the first and second cradles 402 and 403 are slided, to be moved near to and far from each other.

The first cradle 402 for supporting the first clamp 404 includes a cylindrical member 421 through which the rods of the guide rail 401 are penetrated, and a lower table 422 fixed on the cylindrical member 421, while the second cradle 403 for supporting the first clamp 405 includes a cylindrical member 431 through which the rods of the guide rail 401 are penetrated, and a lower table 432 fixed on the cylindrical member 431. The first and second cradles 402 and 403 are connected to an oil-hydraulic cylinder 407 and driven thereby.

The first clamp 404 for clamping a pipe P1 at a right angle with the sliding direction of the first cradle 402 includes an upper table 441 fixed to the first cradle 402 by two pairs of a bolt 408 and a nut 409, a supporting member 442 of L-shape having a corner 445 fixed on the upper table 441 for supporting the pipe P1, and two holding members 443, 443 each having a curved part corresponding to the wall surface of the pipe P1 fixed at both edges of the top surface of the supporting member 442. The pipe P1 is clamped by the corner 445 of the supporting member 442 and the curved parts of the two holding members 443, 443.

The second clamp 405 for clamping a pipe P2 in the sliding direction of the second cradle 403 includes an upper table 451 fixed to the second cradle 403 by two pairs of a bolt 408 and a nut 409, two supporting members 452, 452 allowed to slide on the upper table 451 for supporting the pipe P2, two guides for guiding the supporting members 452, 452, and a threaded bar 455 having a handle 454 for transmitting the rotating power applied to the handle 454 to the supporting members 452, 452 in the sliding direction. The supporting members 452, 452 are moved near to each other by rotating the handle 454 in one direction and move away from each other by rotating the handle 454 in the counter direction. Each of the supporting members 452, 452 has a right angle notch 456 on the surface facing each other, and the pipe P2 is clamped in the right angle notches 456, 456.

The upper table 441 of the first clamp 404 has two arc-shaped bolt holes 411 and 412 which are concentric, while the upper table 451 of the second clamp 405 has two arc-shaped bolt holes 413 and 414 which are concentric. The upper tables 441 and 451 are allowed to move in a circle on the lower tables 422 and 432 respectively by changing the fixing positions of the bolts 408 and the nuts 409.

The heater 406 is fixed on a base (not shown in FIGS.) so as to be allowed to rotate and be located between the first and second cradles 402 and 403. The heater 406 includes a peaked attachment 461 having a peaked edge 464 at a right angle, a recessed attachment 462 having a V-shaped edge 465 at a right angle, and a hand 463. The peaked attachment 461 faces to the first clamp 404 and the recessed attachment 462 faces to the second clamp 405.

Next, a method for making a joined pipe by using the butt-welding apparatus. First, the pipe P1 having a hole in the pipe wall is clamped by the first clamp 404, and the pipe P2 having an opening whose shape corresponds to the hole of the pipe P1 is clamped by the second clamp 405. The mutual direction of the pipes P1 and P2 is set in the desired direction, since the first and second clamps 404 and 405 are fixed on the first and second cradles 402 and 403 respectively so as to be allowed to rotate.

Then, the heater 406 is positioned between the first and second cradles 402 and 403, and the peaked attachment 461 is fitted to the periphery of the hole of the pipe P1 while the recessed attachment 462 is fitted to the opening of the pipe P2, and these parts are heated to be fused. Then, after removing the heater 406 from the position between the first and second cradles 402 and 403, the first and second clamps 404 and 405 are moved so as to butt-weld the fused parts of the pipes P1 and P2 under predetermined pressure. Consequently, the pipes P1 and P2 are butt-welded in the direction depending on the mutual direction of the first and second clamps 404 and 405. Thus, by using the butt-welding apparatus, a joined pipe having a desired shape is obtained (in which the pipes are fixed each other at a right angle or angles of such as 30°, 45°, 60°, etc.).

Figures 47A, 47B:
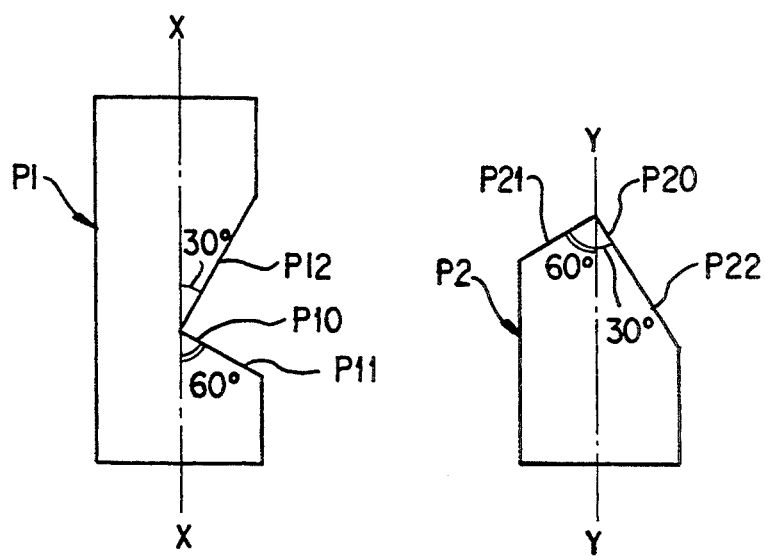
FIGS. 47(a) and 47(b) are side views showing respectively a main pipe and a branch pipe which are to be butt-welded by the butt-welding apparatus in a preferred embodiment according to the invention.

Next, a method for making a joined pipe in which two pipes having the same diameter are fixed to each other at an angle of 60° using the butt-welding apparatus is described. First, as shown in FIG. 47(a), the wall of the pipe P1 is cut to make a V-shaped hole in which two V-shaped edges P10 at a right angle are formed so that the lowest points thereof are located diametrically on the periphery of the pipe P1. Two facets P11 and P12 forming the V-shaped edges P10 are formed to make an angle of 60° and an angle of 30° respectively with the pipe axis X—X. On the other hand, as shown in FIG. 47(b), the wall of the pipe P2 is cut to have two peaked edges P20 at a right angle in which the two peaks thereof are located diametrically on the periphery of the pipe P2. The two facets P21 and P22 forming the peaked edges P20 make an angle of 60° and an angle of 30° with the pipe axis Y—Y.

Figure 48:
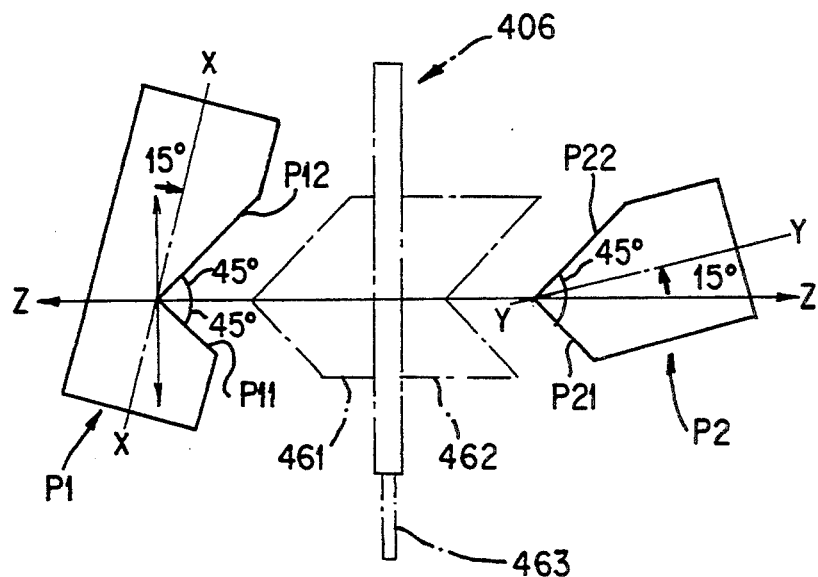
FIG. 48 is an explanatory view illustrating the mutual relation of setting angles of the main and branch pipes to be butt-welded by the butt-welding apparatus in a preferred embodiment according to the invention.

Then, the pipe P1 having the V-shaped hole P10 is clamped by the first clamp 404 so that the V-shaped hole P10 faces the peaked attachment 461 of the heater 406, and the pipe P2 having the peaked edge P20 is clamped by the second clamp 405 so that the peaked edge P20 faces the recessed attachment 462 thereof. In this step, the the first cradle 402 is rotated so that the facets P11 and P12 of the pipe P1 clamped by the first clamp 404 make an angle of 45° with the sliding direction Z—Z of the first and second cradles 402 and 403, and the second cradle 403 is rotated so that the facets P21 and P22 of the pipe P2 clamped by the second clamp 405 make an 45° with the sliding direction Z—Z, as shown in FIG. 48. In more detail, the pipe P1 is rotated in the direction indicated by the arrow shown in FIG. 48 so that the pipe axis X—X makes an angle of 15° with the direction vertical to the sliding axis Z—Z of the first and second cradles 402 and 403, and the pipe P2 is rotated in the direction indicated by the arrow shown in FIG. 48 so that the pipe axis Y—Y makes an angle of 15° with the direction vertical to the sliding axis Z—Z. It is required to clamp the pipe P1 by the first clamp 404 so that the pipe P1 rotates around the lowest point of the V-shaped hole P10 and to clamp the pipe P2 by the second clamp 405 so that the pipe P2 rotates around the peak of the peaked edge P20. Accordingly, the positions of the lowest point of the V-shaped hole P10 of the pipe P1 and the peak of the peaked edge P20 of the pipe P2 do not change after the rotation of the pipes.

Then, the first and second cradles 402 and 403 are moved near to each other, and the facets P11 and P12 are fitted to the peaked attachment 461 of the heater 406 while the facets P21 and P22 are fitted to the recessed attachment 462, and these parts are heated to be fused. In this step, the facets P11 and P12 of the pipe P1 and the facets P21 an P22 of the pipe P2 are moving near to the heater 406 to make contact while the direction of the facets is kept at an angle of 45° with the sliding direction Z—Z of the first and second cradles 402 and 403, so that all the facets P11, P12, P21 and P22 are fused in a uniform fusion condition.

Then, after removing the heater 406 from the position between the first and second cradles 402 and 403, the first and second clamps 404 and 405 move near to each other so as to butt-welding the facets P11 and P12 of the pipe P1 and the facets P21 and P22 of the pipe P2 under predetermined pressure. In this step, the facets P11 and P12 of the pipe P1 and the facets P21 and P22 of the pipe P2 are moving near to each other to make contact while the direction of the facets is kept at an angle of 45° with the sliding direction Z—Z of the first and second cradles 402 and 403, so that the butt-welded facets P11 and P21 make an angle of 60° with the pipe axis X—X and the pipe axis Y—Y and the butt-welded facets P12 and P22 making an angle of 30° with the pipe axis X—X and the pipe axis Y—Y having a uniform fixing strength.

Figure 49:
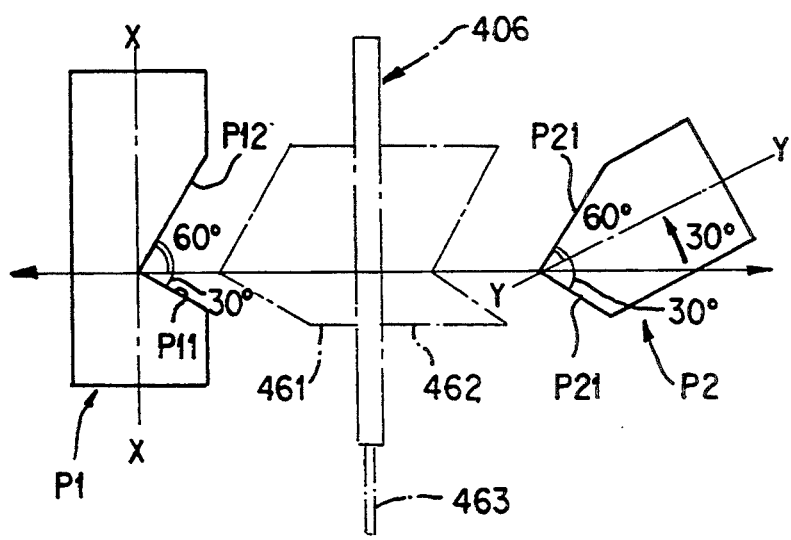
FIG. 49 is a compared explanatory view illustrating the mutual relation of setting angles of the main and branch pipes to be butt-welded by the butt-welding apparatus in a preferred embodiment according to the invention.

As shown in FIG. 49, there is another method in which only the pipe P2 clamped by the second clamp 405 is rotated in the direction indicated by the arrow shown in FIG. 49 so that the pipe axis X—X makes an angle of 30° with the direction vertical to the sliding direction Z—Z of the first and second cradles 402 and 403. In this method, the pipe clamped by the first clamp 404 is slide in the direction vertical to the pipe axis X—X, and the pipe P2 clamped by the second clamp 405 is slide in the direction to make an angle of 30° with the pipe axis Y—Y. However, the facets P11 and P21 which are at an angle of 60° with the pipe axis X—X and Y—Y are fitted to each other in the direction of an angle of 30° with the sliding direction Z—Z of the first and second cradles 402 and 403, while the facets P12 and P22 which are at an angle of 30° with the pipe axes X—X and Y—Y are fitted to each other in the direction of an angle of 60° with the sliding direction Z—Z, thus the butt-welded parts might not have uniform fixing strength. Therefore, it is recommended to rotate the first and second clamps 404 and 405 so that the facets P11 and P12 of the pipe P1 and the facets P21 and 22 of the pipe P2 make an angle of 45° with the sliding direction Z—Z of the first and second cradles 402 and 403.

Thus, it is possible to make a joined pipe with a high fixing strength and excellent quality at low cost by butt-welding the two pipes P1 and P2 with the butt-welding apparatus.

The butt-welding apparatus in the preferred embodiment have been described above, however, concrete configurations of the invention are not limited to the embodiments, and modification of the design is included by the invention while remaining within the gist thereof. For example, the butt-welding apparatus may be used for butt-welding a joint with a pipe, though the case of butt-welding two pipes has been described in the embodiment.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A method for making a joint between a main pipe and a branch pipe by:
    cutting a main pipe to have a hole in the pipe wall so that two V-shaped edges of a right angle are formed in the diametrical positions on the periphery of said main pipe;
    cutting a branch pipe to have facets in the pipe opening so that two peaked edges of a right angle are formed in the diametrical positions on the periphery of said branch pipe;
    fusing the facets of said V-shaped edges of said hole of said main pipe and said peaked edges of said opening of said branch pipe by heating; and
    butt-welding said fused facets together after said fusing step by application of pressure after said fusing step of said V-shaped edges of said hole of said main pipe and said peaked edges of said opening of said branch pipe to form a joint,
    wherein said step of butt-welding is carried out under equal application of pressure in the direction of the center of said V-shaped edges of said hole of said main pipe at an angle of 45° from either side of said V-shaped edges.

2. A method for making a joint between a main pipe and branch pipe by:
    cutting a main pipe to have a hole in the pipe wall so that two V-shaped edges of a right angle are formed in the diametrical positions on the periphery of said main pipe;
    cutting a branch pipe to have facets in the pipe opening so that two peaked edges of a right angle are formed in the diametrical positions on the periphery of said branch pipe;
    fusing the facets of said V-shaped edges of said hole of said main pipe and said peaked edges of said opening of said branch pipe by heating; and
    butt-welding said fused facets together after said fusing step by application of pressure after said fusing step of said V-shaped edges of said hole of said main pipe and said peaked edges of said opening of said branch pipe to form a joint,
    wherein said cutting step of said main pipe comprises the steps of:
        determining two points $b_1$ and $b_2$ which are located diametrically on the periphery of said main pipe, determining a point $a_1$ having an angle $\Theta_1$ which is less than 90° with said points $b_1$ and $b_2$ in the direction of an axis of said main pipe and a right angle in the radius direction thereof;

determining a point $a_2$ which is located to have an angle $\Theta_2$ which is equal to 90° less $\Theta$ with said points $b_1$ and $b_2$ in the direction of said axis which is the same radius direction and opposite axial direction with $a_1$ and a right angle in the radius direction;

cutting said main pipe in a straight line forming an arc connecting said points $b_1$, $a_1$ and $b_2$, and arc connecting said points $b_1$, $a_2$ and $b_2$ and said V-shaped edges; and wherein said cutting step of a branch pipe comprises the steps of:

determining two points $c_1$ and $c_2$ which are located diametrically on the periphery of said branch pipe;

determining a point $d_1$ having said angle $\Theta_1$ with said points $c_1$ and $c_2$ in the direction of an axis of said branch pipe and a right angle in the radius direction;

determining a point $d_2$ having said angle $\Theta_2$ with said points $c_1$ and $c_2$ in the direction of said axis of said branch pipe which is the opposite radius direction and same axial direction with $d_1$ and a right angle in the radius direction; and cutting said branch pipe in a straight in line forming an arc connecting said points $c_1$, $d_1$ and $c_2$, an arc connecting said points $c_1$, $d_2$ and $c_2$ and said peaked edges.

3. A method for making a joint between a main pipe and a branch pipe, comprising the steps of:

cutting a main pipe to have a hole in the pipe wall so that two V-shaped edges of a right angle are formed in the diametrical positions on the periphery of said main pipe;

cutting a branch pipe to have facets in the pipe opening so that two peaked edges of an angle slightly more acute than a right angle are formed in the diametrical positions on the periphery of said branch pipe;

fusing the facets of said V-shaped edges of said hole of said main pipe and said peaked edges of said opening of said branch pipe by heating;

butt-welding said fused facets together after said fusing step by application of pressure after said fusing step of said V-shaped edges of said hole of said main pipe and said peaked edges of said opening of said branch pipe to form a joint, and wherein said step of butt-welding is carried out under equal application of pressure in the direction of the center of said v-shaped edges of said hole of said main pipe at an angle of 45° from either side of said V-shaped edges.

4. A method for making a joint between a main pipe and branch pipe according to claim 3, wherein:

said cutting step of said main pipe comprises the steps of:

determining two points $e_1$ and $e_1$ which are located diametrically on the periphery of said main pipe;

determining a point $f_1$ having an angle $\Theta_3$ which is less than 90° with said points $e_1$ and $e_1$ in the direction of an axis of said main pipe and a right angle in the radius direction;

determining a point $f_2$ which is located to have an angle $\Theta_4$ which is equal to 90° less $\Theta_3$ with said points $e_1$ and $e_2$ in the direction of said axis which is the same radius direction and opposite axial direction with $f_1$ and a right angle in the radius direction; and cutting said main pipe in a straight line forming an arc connecting said points $e_1$, $f_1$ and $e_2$ an arc connecting said points $e_1$, $f_2$ and $e_2$ and said V-shaped edges; and said cutting step of a branch pipe comprises the steps of:

determining two points $g_1$ and $g_2$ which are located diametrically on the periphery of said branch pipe;

determining a point $h_1$ having said angle $\Theta_3$ with said points $g_1$ and $g_2$ in the direction of said axis of said branch pipe and a right angle in the radius direction;

determining a point $h_2$ having said angle $\Theta_4$ with said points $g_1$ and $g_2$ in the direction of said axis of said branch pipe which is the opposite radius direction and same axial direction with $h_1$ and a right angle in the radius direction;

determining points $i_1$ and $i_2$ which are at a little distance from said points $g_1$ and $g_2$ in the direction of said axis of said branch pipe which is the opposite axial direction; and cutting said branch pipe in a straight in line forming an arc connecting said points $i_1$, $h_1$ and $i_2$, an arc connecting said points $i_1$, $h_2$ and $i_2$ and said peaked edges.

5. A method for making a joint between a main pipe and a branch pipe, according to claim 4, wherein:

said points $i_1$ and $i_2$ are located in the direction parallel to said axis of said branch pipe with a distance of 5 mm or less away from said points $g_1$ and $g_2$.

6. A method for making a joint between a main pipe and a branch pipe, comprising the steps of:

cutting a main pipe to have a hole in the pipe wall so that two V-shaped edges of a right angle are formed in the diametrical positions on the periphery of said main pipe;

cutting a branch pipe to have facets in the pipe opening so that two peaked edges of a right angle or an angle slightly more acute than a right angle are formed in the diametrical positions on the periphery of said branch pipe;

fusing the facets of said V-shaped edges of said hole of said main pipe and said peaked edges of said opening of said branch pipe by heating with a core inserted into said branch pipe to contact the whole surface of said peaked edges; and butt-welding said fused facets together after said fusing step by application of pressure after said fusing step of said V-shaped edges of said hole of said main pipe and said peaked edges of said opening of said branch pipe to form a joint, wherein said step of butt-welding is carried out under equal application of pressure in the direction of the center of said V-shaped edges of said hole of said main pipe at an angle of 45° from either side of said V-shaped edges.

7. A method for making a joint between a main pipe and a branch pipe, according to claim 6, wherein:

said core is inserted into said branch pipe with a clearance of approximately 0.25 mm on average between the outer surface of said core and the inner surface of said branch pipe.

8. A method for making a joint between a main pipe and a branch pipe, by:

cutting a main pipe to have a hole in the pipe wall so that a first main pipe facet provided at an angle more acute than 45° to an axis of said main pipe and a second main pipe facet provided at a right angle to said first main pipe facet are formed in which said two facets meet at two points located diametrically on the periphery of said main pipe to make two V-shaped edges of a right angle in the diametrical positions on the periphery of said main pipe;

cutting a branch pipe to have facets in the pipe opening so that a first branch pipe facet provided at an angle more acute than 45° to an axis of said branch pipe and a second branch pipe facet provided at a right angle to said first branch pipe facet are formed in which said two facets meet at two points located diametrically on the periphery of said branch pipe to make two peaked edges of a right angle in the diametrical positions on the periphery of said branch pipe;

fusing the facets of said V-shaped edges of said hole of said main pipe and said peaked edges of said opening of said branch pipe by heating; and butt-welding said fused facets together after said fusing step by application of pressure after said fusing step of said V-shaped edges of said hole of said main pipe and said peaked edges of said opening of said branch pipe to form a joint, wherein:

said step of butt-welding is carried out under equal application of pressure in the direction of the center of said V-shaped edges of said hole of said main pipe at an angle of 45° from either side of said V-shaped edges.

9. A method for making a joint between a main pipe and a branch pipe, comprising the steps of:

cutting a main pipe to have a hole in the pipe wall so that two V-shaped edges of a right angle are formed at points located slightly away from diametrical positions on the periphery of said main pipe;

cutting a branch pipe to have facets in the pipe opening so that two peaked edges of a right angle or an angle slightly more acute than a right angle are formed in the diametrical positions on the periphery of said branch pipe;

fusing the facets of said V-shaped edges of said hole of said main pipe and said peaked edges of said opening of said branch pipe by heating;

butt-welding said fused facets together by application of pressure after said fusing step of said V-shaped edges of said hole of said main pipe and said peaked edges of said opening of said branch pipe to form a joint, and wherein said step of butt-welding is carried out under equal application of pressure in the direction of the center of said V-shaped edges of said hole of said main pipe at an angle of 45° from either side of said V-shaped edges.

* * * * *